United States Patent
Shoaib et al.

(10) Patent No.: US 10,055,672 B2
(45) Date of Patent: Aug. 21, 2018

(54) METHODS AND SYSTEMS FOR LOW-ENERGY IMAGE CLASSIFICATION

(71) Applicant: MICROSOFT TECHNOLOGY LICENSING, LLC, Redmond, WA (US)

(72) Inventors: Mohammed Shoaib, Redmond, WA (US); Swagath Venkataramani, West Lafayette, IN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 34 days.

(21) Appl. No.: 14/715,554

(22) Filed: May 18, 2015

(65) Prior Publication Data

US 2016/0267358 A1     Sep. 15, 2016

Related U.S. Application Data

(60) Provisional application No. 62/131,814, filed on Mar. 11, 2015.

(51) Int. Cl.
  *G06K 9/00*     (2006.01)
  *G06K 9/62*     (2006.01)
  (Continued)

(52) U.S. Cl.
  CPC ....... *G06K 9/6267* (2013.01); *G06K 9/00973* (2013.01); *G06K 9/4642* (2013.01); *G06T 1/20* (2013.01)

(58) Field of Classification Search
  CPC .. G06N 3/02; G06N 5/00; G06N 7/02; G06N 99/005; G05B 13/00; G06T 2207/20081;
  (Continued)

(56) References Cited

U.S. PATENT DOCUMENTS

| 4,727,503 A | 2/1988 | McWhirter |
|---|---|---|
| 5,274,832 A | 12/1993 | Khan |

(Continued)

FOREIGN PATENT DOCUMENTS

| EP | 1564682 A2 | 8/2005 |
|---|---|---|
| JP | 8140094 A | 5/1996 |

(Continued)

OTHER PUBLICATIONS

"Internatonal Search Report & Written Opinion Received for PCT Application No. PCT/US2016/019440", dated Jun. 22, 2016, 12 Pages.

(Continued)

*Primary Examiner* — Aaron W Carter

(57) ABSTRACT

Examples of the disclosure enable efficient processing of images. In some examples, one or more interest points are identified in an image. One or more features are extracted from the identified interest points using a filter module, a gradient module, a pool module, and/or a normalizer module. The extracted features are aggregated to generate one or more vectors. Based on the generated vectors, it is determined whether the extracted features satisfy a predetermined threshold. Based on the determination, the image is classified such that the image is configured to be processed based on the classification. Aspects of the disclosure facilitate conserving memory at a local device, reducing processor load or an amount of energy consumed at the local device, and/or reducing network bandwidth usage between the local device and the remote device.

20 Claims, 14 Drawing Sheets

(51) Int. Cl.
*G06T 1/20* (2006.01)
*G06K 9/46* (2006.01)

(58) Field of Classification Search
CPC ... G06T 7/0079; G06T 7/0083; G06T 7/0085; G06T 1/20; G06K 2009/485; G06K 9/34; G06K 9/4604; G06K 9/48; G06K 9/4609; G06K 9/4623; G06K 9/4642; G06K 9/4652; G06K 9/6267; G06K 9/00973
USPC ....... 382/190, 195, 199, 201, 203, 224, 159, 382/155
See application file for complete search history.

(56) References Cited

U.S. PATENT DOCUMENTS

| | | |
|---|---|---|
| 5,784,108 A | 7/1998 | Skaletzky et al. |
| 5,982,350 A | 11/1999 | Hekmatpour et al. |
| 5,999,662 A | 12/1999 | Burt et al. |
| 6,075,905 A | 6/2000 | Herman et al. |
| 6,078,701 A | 6/2000 | Hsu et al. |
| 6,141,693 A | 10/2000 | Perlman et al. |
| 6,405,185 B1 | 6/2002 | Pechanek et al. |
| 6,988,008 B2 | 1/2006 | Hudson et al. |
| 7,375,745 B2 | 5/2008 | Rai et al. |
| 7,460,730 B2 | 12/2008 | Pal et al. |
| 7,564,996 B2 | 7/2009 | Kloth |
| 7,944,450 B2 | 5/2011 | Bakalash et al. |
| 8,165,401 B2 | 4/2012 | Funayama et al. |
| 8,184,696 B1 | 5/2012 | Chirila-Rus et al. |
| 8,195,733 B2 | 6/2012 | Seki |
| 8,248,482 B2 | 8/2012 | Oks et al. |
| 8,589,467 B2 | 11/2013 | Seki |
| 8,699,821 B2 | 4/2014 | Orr et al. |
| 8,712,162 B2 | 4/2014 | Kirsch |
| 8,798,313 B2 | 8/2014 | Simske et al. |
| 8,805,123 B2 | 8/2014 | Shirron et al. |
| 8,854,491 B2 | 10/2014 | Ford et al. |
| 8,886,206 B2 | 11/2014 | Lord et al. |
| 9,418,283 B1* | 8/2016 | Natarajan .......... G06K 9/00463 |
| 2003/0018630 A1 | 1/2003 | Indeck et al. |
| 2004/0004543 A1* | 1/2004 | Faulkner .......... G08B 13/19656 340/531 |
| 2004/0120591 A1 | 6/2004 | Brower et al. |
| 2004/0179719 A1 | 9/2004 | Chen et al. |
| 2004/0218830 A1 | 11/2004 | Kang et al. |
| 2005/0020912 A1 | 1/2005 | Kiraly et al. |
| 2005/0169529 A1 | 8/2005 | Owechko et al. |
| 2006/0159325 A1* | 7/2006 | Zeineh ................ G06F 19/3443 382/128 |
| 2008/0055423 A1* | 3/2008 | Ying ................ G08B 13/19684 348/211.99 |
| 2008/0084419 A1 | 4/2008 | Bakalash et al. |
| 2008/0225948 A1 | 9/2008 | Lin et al. |
| 2010/0054628 A1 | 3/2010 | Levy et al. |
| 2010/0111429 A1 | 5/2010 | Wang et al. |
| 2010/0250640 A1 | 9/2010 | Seki |
| 2011/0173565 A1 | 7/2011 | Ofek et al. |
| 2011/0231419 A1* | 9/2011 | Papke .............. G06F 17/30793 707/756 |
| 2011/0264888 A1 | 10/2011 | Dasu et al. |
| 2012/0011142 A1 | 1/2012 | Baheti et al. |
| 2012/0105680 A1 | 5/2012 | Park |
| 2012/0154633 A1 | 6/2012 | Rodriguez |
| 2012/0233540 A1 | 9/2012 | Collet et al. |
| 2012/0301032 A1 | 11/2012 | Kawanishi et al. |
| 2012/0321175 A1* | 12/2012 | Hedau ................ G06K 9/6231 382/159 |
| 2013/0057644 A1 | 3/2013 | Stefanoski et al. |
| 2013/0067590 A1 | 3/2013 | Hutchings et al. |
| 2013/0114849 A1* | 5/2013 | Pengelly .............. G06F 17/289 382/103 |
| 2013/0170738 A1 | 7/2013 | Capuozzo et al. |
| 2013/0279872 A1 | 10/2013 | Shimosato et al. |
| 2014/0037203 A1 | 2/2014 | Garcia Morato Fernandez Baillo et al. |
| 2014/0043329 A1 | 2/2014 | Wang et al. |
| 2014/0118402 A1 | 5/2014 | Gallo et al. |
| 2014/0267799 A1 | 9/2014 | Sadasivam et al. |
| 2014/0270536 A1* | 9/2014 | Amtrup .............. G06K 9/00442 382/195 |
| 2014/0293069 A1* | 10/2014 | Lazar ................ G06F 17/30256 348/207.1 |
| 2014/0300686 A1 | 10/2014 | Campbell et al. |
| 2014/0362240 A1 | 12/2014 | Klivington et al. |
| 2015/0071528 A1* | 3/2015 | Marchisio ............ G06K 9/6269 382/159 |
| 2015/0163442 A1 | 6/2015 | Han et al. |
| 2015/0286885 A1* | 10/2015 | Bulan .................. G06K 9/4642 382/104 |
| 2016/0140702 A1 | 5/2016 | Kindle et al. |
| 2016/0267111 A1* | 9/2016 | Shoaib ........................ G06T 1/20 |
| 2016/0267324 A1* | 9/2016 | Shoaib .............. G06K 9/00536 |
| 2016/0267358 A1* | 9/2016 | Shoaib .............. G06K 9/00973 |

FOREIGN PATENT DOCUMENTS

| | | |
|---|---|---|
| WO | 2008039635 A2 | 4/2008 |
| WO | 2008150840 A1 | 12/2008 |
| WO | 2013095773 A1 | 6/2013 |

OTHER PUBLICATIONS

Ta, et al., "SURFTrac: Efficient Tracking and Continuous Object Recognition using Local Feature Descriptors", In Proceedings of IEEE Conference on Computer Vision and Pattern Recognition, Jun. 20, 2009, 8 pages.

Oztarak, et al., "Efficient and Accurate Object Classification in Wireless Multimedia Sensor Networks", In Proceedings 21st International Conference on Computer Communications and Networks, Jul. 30, 2012, 7 pages.

Ko, et al., "Exploring Tradeoffs in Accuracy, Energy and Latency of Scale Invariant Feature Transform in Wireless Camera Networks", In Proceedings of First ACM/IEEE International Conference on Distributed Smart Cameras, Sep. 25, 2007, 8 pages.

Soro, et al., "A Survey of Visual Sensor Networks", In Proceedings of Advances in Multimedia, vol. 2009, May 1, 2009, 18 pages.

Zorbasa, et al., "Energy efficient mobile target tracking using flying drones", In Proceedings of the 4th International Conference on Ambient Systems, Networks and Technologies, Jun. 25, 2013, 8 pages.

Viksten, et al., "Point-of-Interest Detection for Range Data", In Proceedings of 19th International Conference on Pattern Recognition, Dec. 8, 2008, 4 pages.

Din, Rongjun, "An Object-Based Hierarchical Method for Change Detection Using Unmanned Aerial Vehicle Images", In Proceedings of Remote Sensing, vol. 6, Issue 9, Aug. 25, 2014, 22 pages.

Bahl, et al., "Vision: Cloud-Powered Sight for All: Showing the Cloud What You See", In Proceedings of the Third ACM Workshop on Mobile Cloud Computing and Services, Jun. 25, 2012, 8 pages.

Wolf, et al., "Smart Cameras as Embedded Systems", In Computer, vol. 35, Issue 9, Sep. 2002, 6 pages.

Krizhevsky, et al., "Imagenet Classification with Deep Convolutional Neural Networks", In Advances in Neural Information Processing Systems, Dec. 3, 2012, 9 pages.

Shoaib, et al., "Energy Scaling in Multi-tiered Sensing Systems through Compressive Sensing", In IEEE Proceedings of the Custom Integrated Circuits Conference, Sep. 15, 2014, 8 pages.

Perronnin, et al., "Improving the Fisher Kernel for Large-scale Image Classification", In Proceedings of the 11th European Conference on Computer Vision: Part IV, Sep. 5, 2010, 14 pages.

Brostow, et al., "Segmentation and Recognition Using Structure from Motion Point Clouds", In Proceedings of the 10th European Conference on Computer Vision: Part I, Oct. 12, 2008, 14 pages.

Duran-Faundez, et al., "Tiny Block-Size Coding for Energy-Efficient Image Compression and Communication in Wireless Camera

(56) References Cited

OTHER PUBLICATIONS

Sensor Networks", In Journal of Signal Processing: Image Communication, vol. 26, Issues 8-9, Oct. 2011, 16 pages.
Ahmad, et al., "Energy Efficient Video Compression for Wireless Sensor Networks", In 43rd Annual Conference on Information Sciences and Systems, Mar. 18, 2009, 6 pages.
Shen, et al., "A CMOS Image Sensor with On-chip Image Compression based on Predictive Boundary Adaptation and Memoryless QTD Algorithm", In IEEE Transactions on Very Large Scale Integration Systems, vol. 19, Issue. 4, Apr. 4, 10 pages.
"OmniVision", Retrieved on: Jan. 2, 2015 Available at: http://www.ovt.com/.
Likamwa, et al., "Energy Characterization and Optimization of Image Sensing Toward Continuous Mobile Vision", In Proceeding of the 11th Annual International Conference on Mobile Systems, Applications, and Services, Jun. 25, 2013, 13 pages.
Cuervo, et al., "Maui: Making Smartphones Last Longer with Code Offload", In Proceedings of the 8th International Conference on Mobile Systems, Applications, and Services, Jun. 15, 2010, 14 pages.
Xian, et al., "Adaptive Computation Offloading for Energy Conservation on Battery-powered Systems", In Proceedings of the International Conference on Parallel and Distributed Systems, vol. 02, Dec. 5, 2007, 8 pages.
Harris, et al., "A Combined Corner and Edge Detector", In Proceedings of the Fourth Alvey Vision Conference, Aug. 31, 1988, 6 pages.
Winder, et al., "Picking the Best Daisy", In Conference on Computer Vision and Pattern Recognition, Jun. 2009, 8 pages.
Sanchez, et al., "Image Classification with the Fisher Vector: Theory and Practice", In International Journal of Computer Vision vol. 105, Issue 3, Dec. 2013, 24 pages.
Griffin, et al., "Caltech-256 Object Category Dataset", In Caltech Technical Report No. CNS-TR-2007-001, Retrieved on: Jan. 2, 2014, 20 pages.
Lecun, et al., "Learning Methods for Generic Object Recognition with Invariance to Pose and Lighting", In Proceedings of the IEEE Computer Society Conference on Computer Vision and Pattern Recognition, vol. 2, Jun. 27, 2004, 8 pages.
Everingham, et al., "The Pascal Visual Object Classes Challenge: A Retrospective", In International Journal of Computer Vision, Jun. 2014, 38 pages.
"Low Power Advantage of 802.11a/g vs. 802.11b", Published on: Dec. 2003 Available at: http://focus.ti.com/pdfs/bcg/80211_wp_lowpower.pdf.
"Second Written Opinion Issued in PCT Application No. PCT/US2016/019440", dated Jan. 27, 2017, 4 Pages.
"Final Office Action Issued in U.S. Appl. No. 14/715,555", dated May 3, 2017, 29 Pages.
"Non Final Office Action Issued in U.S. Appl. No. 14/715,555", dated Oct. 20, 2016, 30 Pages.
"Non Final Office Action Issued in U.S. Appl. No. 14/715,557", dated Jun. 8, 2017, 14 pages.
"Final Office Action Issued in U.S. Appl. No. 14/715,561", dated May 12, 2017, 19 Pages.
"Non Final Office Action Issued in U.S. Appl. No. 14/715,561", dated Sep. 23, 2016, 17 Pages.
Atoche, et al., "An Improved RBR Image Reconstruction Architecture based on Super-Systolic Techniques", In Journal of Ambient Intelligence and Humanized Computing, vol. 05, Issue 5, Aug. 2, 2013, pp. 655-666.
Cappello, et al., "A Practical Measure of FPGA Floating Point Acceleration for High Performance Computing", In IEEE 24th International Conference on Application-Specific Systems, Architectures and Processors, Jun. 5, 2013, 8 Pages.

Catanzaro, Bryan, "OpenCL Optimization Case Study: Simple Reductions", Retrieved from <<https://web.archive.org/web/20140328141636/http://developer.amd.com/resources/documentation-articles/articles-whitepapers/opencl-optimization-case-study-simple-reductions/>, Aug. 24, 2010, 17 Pages.
Cluff, et al., "GPU-Accelerated Hierarchical Dense Correspondence for Real-Time Aerial Video Processing", In Proceedings of the Workshop on Motion and Video Computing, Dec. 8, 2009, 8 Pages.
Gammeter, et al., "Server-Side Object Recognition and Client-Side Object Tracking for Mobile Augmented Reality", In Proceedings of Conference on Computer Vision and Pattern Recognition Workshops, Jun. 13, 2010, 8 Pages.
Kung, et al., "One-Dimensional Systolic Arrays for Multidimensional Convolution and Resampling", In VLSI for Pattern Recognition and Image Processing, vol. 13, Jan. 1984, 6 Pages.
Pandey, et al., "Systolic Query Processing for Aggregation in Sensor Networks", In Proceedings of the 3rd International Conference on Ubiquitous Intelligence and Computing, Jan. 2006, 10 Pages.
"International Preliminary Report on Patentability Issued in PCT Application No. PCT/US2016/019441", dated Jun. 13, 2017, 8 Pages.
"International Search Report & Written Opinion Issued in PCT Application No. PCT/US2016/019441", dated Jun. 15, 2016, 14 Pages.
"Second Written Opinion Issued in PCT Application No. PCT/US2016/019441", dated Feb. 8, 2017, 7 Pages.
"International Search Report & Written Opinion Issued in PCT Application No. PCT/US2016/019980", dated Jun. 29, 2016, 13 Pages.
Plaza, et al., "High Performance Computing for Hyperspectral Remote Sensing", In IEEE Journal of Selected Topics in Applied Earth Observations and Remote Sensing, vol. 4, Issue 3, Sep. 2011, pp. 528-544.
Shayegan, et al., "A Novel Two-Stage Spectrum-Based Approach for Dimensionality Reduction: A Case Study on the Recognition of Handwritten Numerals", In Journal of Applied Mathematics, vol. 2014, May 12, 2014, 19 Pages.
Sun, et al., "Optimizing Decomposition-Based Packet Classification Implementation on FPGAs", In International Conference on Reconfigurable Computing and FPGAs, Nov. 30, 2011, 6 Pages.
Ttofis, et al., "A Hardware-Efficient Architecture for Accurate Real-Time Disparity Map Estimation", In ACM Transactions on Embedded Computing Systems, vol. 14, Issue 02, Feb. 17, 2015, 26 Pages.
Tung-Hoe Wong, Albert, "A New Scalable Systolic Array Processor Architecture for Discrete Convolution", A Thesis Submitted in Partial Fulfillment of the Requirements for the Degree of Master of Science in Electrical Engineering in the College of Engineering at the University of Kentucky, Jan. 2003, 175 Pages.
Venkataramani, et al., "SAPPHIRE: An Always-on Context-aware Computer Vision System for Portable Devices", In Proceedings of the Design, Automation & Test in Europe Conference & Exhibition, Mar. 9, 2015, 6 Pages.
Whitwam, Ryan, "[Lollipop Feature Spotlight] Smart Lock Brings 'Trusted Face' Mode That Makes Face Unlock So Amazing You Might Actually Use It", Retrieved from <<http://www.androidpolice.com/2014/10/20/lollipop-feature-spotlight-smart-lock-brings-trusted-face-mode-that-makes-face-unlock-so-amazing-you-might-actually-use-it/>>, Oct. 20, 2014, 8 Pages.
Zelnik-Manor, et al., "Multi-Frame Alignment of Planes", In IEEE Computer Society Conference on Computer Vision and Pattern Recognition, vol. 1, Jun. 23, 1999, pp. 151-156.
"International Preliminary Report on Patentability Issued in PCT Application No. PCT/US2016/019440", dated Jun. 13, 2017, 7 Pages.

* cited by examiner

METHODS AND SYSTEMS FOR LOW-ENERGY IMAGE CLASSIFICATION

CROSS-REFERENCE TO RELATED APPLICATIONS

This application claims the benefit of U.S. Provisional Application No. 62/131,814, filed Mar. 11, 2015.

This application is related to Context-Awareness Through Biased On-Device Image Classifiers, filed concurrently herewith and incorporated by reference herein.

This application is related to Two-Stage Vector Reduction Using Two-Dimensional and One-Dimensional Systolic Arrays, filed concurrently herewith and incorporated by reference herein.

This application is related to Methods and Systems for Generating Enhanced Images Using Multi-Frame Processing, filed concurrently herewith and incorporated by reference herein.

BACKGROUND

Images may be generated and processed to provide actionable information. Known methods of generating and processing images are resource intensive and, for at least some portable devices, may result in shortening battery life by approximately 90%. To conserve or manage local resources at the portable device, at least some known portable devices transmit each image to a cloud-based server for processing. Transmitting each image, however, may consume a lot of bandwidth, increase communication costs, and/or increase latency.

SUMMARY

Examples of the disclosure efficiently and effectively process one or more images. In some examples, one or more interest points are identified in an image. One or more features are extracted from the identified interest points using a filter module, a gradient module, a pool module, and/or a normalizer module. The extracted features are aggregated to generate one or more vectors. Based on the generated vectors, it is determined whether the extracted features satisfy a predetermined threshold. Based on the determination, the image is classified such that the image is configured to be processed based on the classification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings

DETAILED DESCRIPTION

Examples of the disclosure efficiently and effectively process data (e.g., images) by arranging one or more modules to identify an interest point, extract a feature, and classify information based on the extracted feature. Examples of hardware for performing the image processing are disclosed.

Aspects of the disclosure facilitate conserving memory at a local device by storing relative simple modules at the local device and storing relatively complex modules at a remote device, reducing processor load or an amount of energy consumed at the local device by performing relative simple operations at the local device and performing relatively complex operations at the remote device, and/or reducing network bandwidth usage between the local device and the remote device by filtering out less-relevant data to transmit more-relevant data from the local device to the remote device. For example, the portable device may filter out less-relevant data from the more-relevant data, and transmit the more-relevant data to a remote device to further analyze the more-relevant data. The disclosed architecture is pipelined, with several modules running in parallel, to facilitate processing images more quickly and efficiently.

In some examples, the feature-based image classifier is biased to have relatively high recall and modest precision. The image classifier is biased to be over-inclusive. That is, the image classifier is biased to classify a plurality of images with a relatively high degree of confidence such that all of the images containing one or more concepts/objects of interest (e.g., "true positives") are selected for further processing at the cost of also selecting one or more images not containing a concept/object of interest (e.g., "false positives"). That is, the image classifier is biased to falsely determine that at least one image not containing a concept/object of interest is associated with a concept/object of interest when the image.

Example System and Environment

Figure 1:
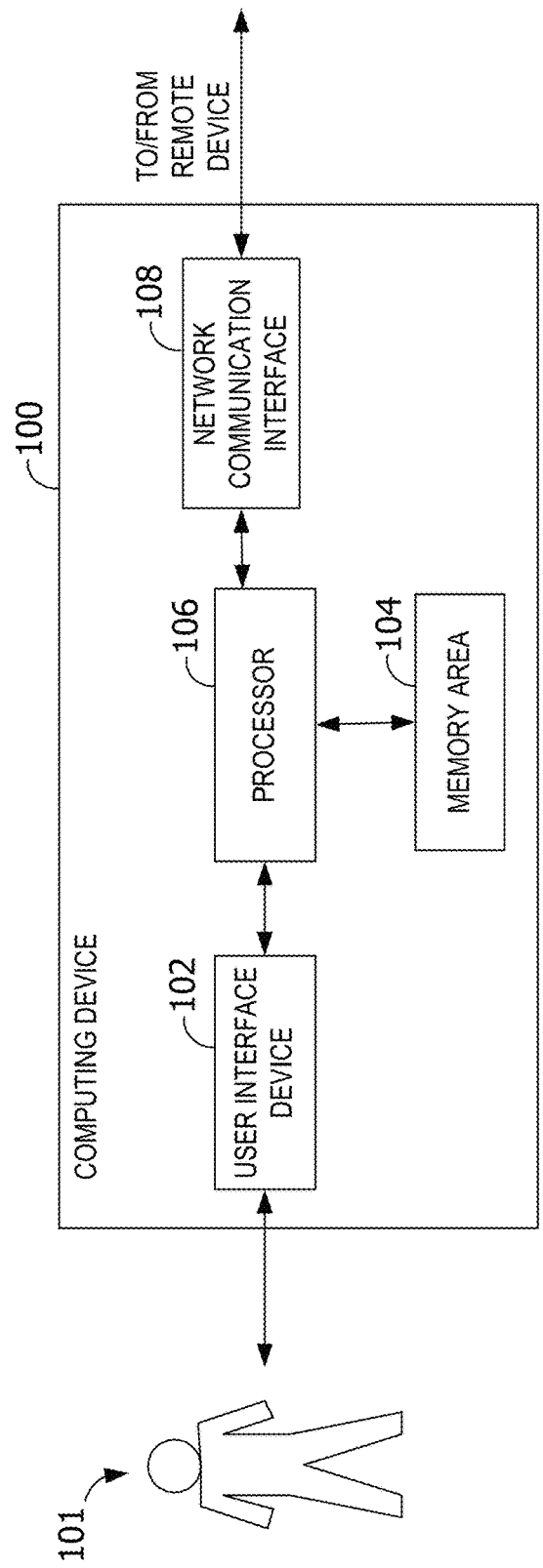
FIG. 1 is a block diagram of an example computing device that may be used to process an image.

FIG. 1 is an illustration of a computing device 100 that may be used to process data (e.g., images). A user 101 may operate the computing device 100. In some examples, the computing device 100 may be always on. In other examples, the computing device 100 may turn on and/or off in response to stimuli (e.g., change in light conditions, movement in the visual field, change in weather conditions) or in accordance with a policy (e.g., during predetermined hours of the day, when a vehicle is on).

While some examples of the disclosure are illustrated and described herein with reference to the computing device 100 being a mobile device and/or a server, aspects of the disclosure are operable with any device that generates, captures, records, retrieves, receives, or processes images (e.g., computers with cameras, mobile devices, security systems). For example, the computing device 100 may be or include a portable media player, mobile telephone, tablet, netbook, laptop, desktop personal computer, computing pad, kiosks, tabletop devices, industrial control devices, wireless charging stations, electric automobile charging stations, and other computing devices. The computing device 100 may represent a group of processing units or other computing devices.

The computing device 100, in some examples, includes a user interface device 102 for exchanging data between the computing device 100 and the user 101, computer-readable media, and/or another computing device (not shown). In at least some examples, the user interface device 102 is coupled to or includes a presentation device configured to present information, such as text, images, audio, video, graphics, alerts, and the like, to the user 101. For example, the presentation device may include, without limitation, a display, speaker, and/or vibrating component. Additionally or alternatively, the user interface device 102 is coupled to or includes an input device configured to receive information, such as user commands, from the user 101. For example, the input device may include, without limitation, a game controller, camera, microphone, and/or accelerometer. In at least some examples, the presentation device and the input device may be integrated in a common user-interface device configured to present information to the user 101 and receive information from the user 101. For example, the user-interface device may include, without limitation, a capacitive touch screen display and/or a controller including a vibrating component.

The computing device 100 includes one or more computer-readable media, such as a memory area 104 storing computer-executable instructions, video or image data, and/or other data, and one or more processors 106 programmed to execute the computer-executable instructions for implementing aspects of the disclosure. For example, the memory area 104 may store one or more computer-executable components for generating, capturing, recording, retrieving, receiving, classifying, understanding, or otherwise processing the images. The memory area 104 includes any quantity of media associated with or accessible by the computing device 100. The memory area 104 may be internal to the computing device 100 (as shown in FIG. 1), external to the computing device 100 (not shown), or both (not shown).

In some examples, the memory area 104 stores, among other data, one or more applications. The applications, when executed by the processor 106, operate to perform functionality on the computing device 100. Example applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The processor 106 includes any quantity of processing units, and the instructions may be performed by the processor 106 or by multiple processors within the computing device 100 or performed by a processor external to the computing device 100. The processor 106 is programmed to execute instructions such as those illustrated in the figures (e.g., FIGS. 4 and 7).

The processor 106 is transformed into a special purpose microprocessor by executing computer-executable instructions or by otherwise being programmed. For example, the processor 106 may execute the computer-executable instructions to capture data corresponding to an image, identify an interest point in an image, extract a feature from an interest point, aggregate features to generate a vector, determine whether a feature satisfies a predetermined threshold, classify an image, transmit an image, and/or process an image. Although the processor 106 is shown separate from the memory area 104, examples of the disclosure contemplate that the memory area 104 may be onboard the processor 106 such as in some embedded systems.

A network communication interface 108, in some examples, exchanges data between the computing device 100 and a computer-readable media or another computing device (not shown). In at least some examples, the network communication interface 108 transmits the image to a remote device and/or receives requests from the remote device. Communication between the computing device 100 and a computer-readable media or another computing device may occur using any protocol or mechanism over any wired or wireless connection.

The block diagram of FIG. 1 is merely illustrative of an example system that may be used in connection with one or more examples of the disclosure and is not intended to be limiting in any way. Further, some peripherals or components of the computing device 100 known in the art are not shown, but are operable with aspects of the disclosure. At least a portion of the functionality of the various elements in FIG. 1 may be performed by other elements in FIG. 1, or an entity (e.g., processor, web service, server, application program, computing device, etc.) not shown in FIG. 1.

Figure 2:
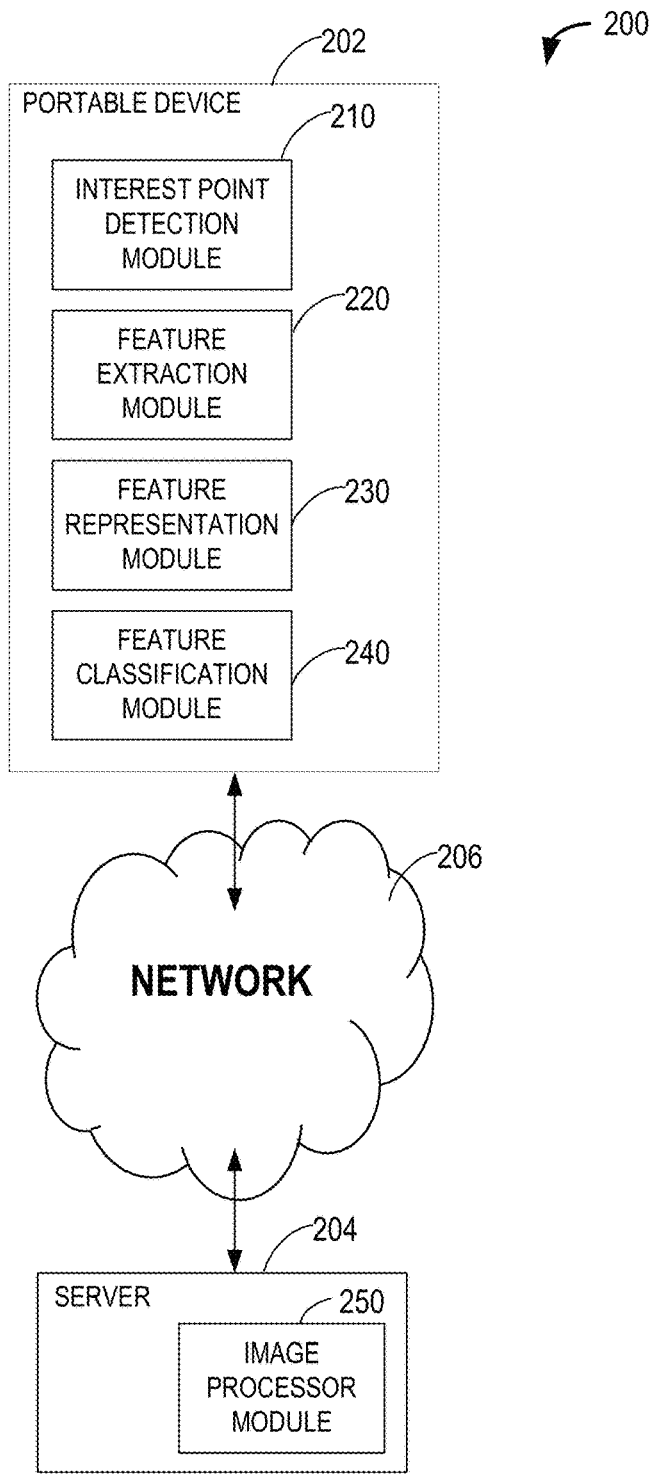
FIG. 2 is a block diagram of an example environment including a portable device and a server that may be used to process an image.

FIG. 2 is an illustration of an environment 200 for processing an image in an ambient-aware system. The environment 200 includes a portable or mobile device 202 and a remote server 204. The mobile device 202 may include a sensor module (e.g., camera) configured to take or capture one or more images (e.g., pictures, video) of its surroundings. For example, the sensor module detects one or more objects and generates one or more images associated with the detected objects. In at least some examples, the sensor module generates a stream of images (e.g., generates a plurality of frames per second) and/or streams the images (e.g., transmits a plurality of frames per second). The sensor module may be located on a mobile device 202, such as a cellular device, a camera located on a vehicle, and/or a wearable camera, or a stationary camera, such as a camera used in a security system.

The mobile device 202 is configured to implement low-complexity processes or operations including detecting interest points, extracting features, representing features, and/or classifying images. For example, the mobile device 202 may include an interest point-detection module 210 configured to detect one or more interest points in an image, a feature-extraction module 220 configured to extract one or more features from an interest point, a feature-representation module 230 configured to generate one or more vectors representative of a feature, and a feature-classification module 240 configured to classify one or more images. A quantity of detected interest points, extracted features, and/or identified images is associated with a desired power consumption of the mobile device 202. In at least some examples, a local, image-classification module is biased to be over inclusive in identifying images transmitted to the server 204 for further processing. In the example of a camera located on a vehicle, the mobile device 202 may identify objects that may potentially be traffic signals, pedestrians, and/or navigational hazards for further processing at the server 204.

The server 204 is configured to implement high-complexity processes or operations including recognizing objects, understanding images, and/or generating actionable items. For example, the server 204 may include an image processor module 250 configured to recognize one or more features, understand one or more images, and/or generate one or more actionable items. The results of the image processor module 250 (e.g., the actionable items) are, in some examples, communicated back to the mobile device 202 through the network 206 for use in applications operating on the mobile device 202. In the example of a camera located on a vehicle, the mobile device 202 may receive data, including actionable items, from the server 204 and use the data with one or more ambient-aware applications, such as a navigation application and/or a hyper-local advertising application. In this manner, the mobile device 202 allows a user to interact with the physical world through sensors and/or automated analysis. For example, the mobile device 202 may enable a user to detect, avoid, and/or navigate around obstacles and document experiences by archiving at least some data. In at least some examples, the server 204 is a cloud-based server that is coupled to the mobile device 202 through a network 206. The network 206 may be a wireless network or a hard-wired network. Alternatively, the server 204 may be coupled to the mobile device 202 via any connection that enables the environment 200 to function as described herein.

Processes or operations are divided or split such that one set of processes are implemented on a local platform (e.g., the mobile device 202) and another set of processes are implemented on a remote platform (e.g., the server 204). Although one arrangement of modules is described, the modules may be arranged in any manner that enables the environment 200 to function as described herein.

Architecture for Low-Energy Image Classification on Portable Devices

Figure 3:
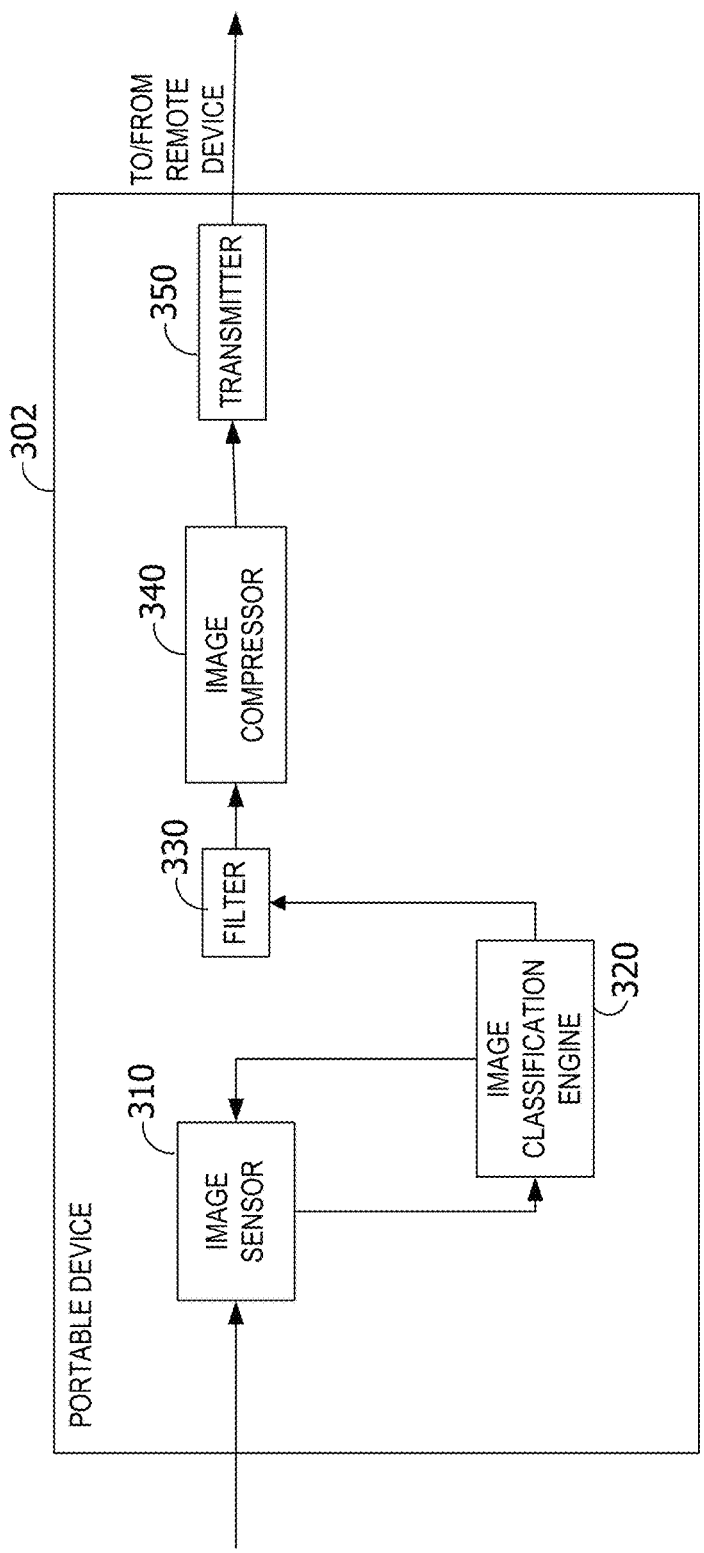
FIG. 3 is a block diagram of an example portable device, such as the portable device shown in FIG. 2 that may be used to perform low-complexity object classification and transmit one or more images to a remote computing device, such as the server shown in FIG. 2.

FIG. 3 is an illustration of the mobile device 202 that performs low-complexity object classification and transmits images associated with one or more predetermined objects of interest to a remote device (e.g., server 204). In an example of a camera located on a vehicle, an object of interest may be a traffic signal, a pedestrian, a navigational hazard, or any other feature that enables the mobile device 202 to function as described herein. The mobile device 202 includes a sensor module or image sensor 310. In some examples, the image sensor 310 captures data corresponding to one or more images and/or frames. Additionally or alternatively, one or more images may be received from another source, such as through text message, email, chat feature, the Internet, etc.

To efficiently classify images, the mobile device 202 includes an image classification engine 320 configured to classify one or more images and a filter 330 configured to separate the images based on a classification of the image. In at least some examples, frames of interest are processed by the image classification engine 320 and the filter 330 before they are compressed by an image compressor 340 and transmitted to a remote device (e.g., server 204) by a transmitter 350. In at least some examples, the image classification engine 320 classifies a plurality of images into a first set of images (e.g., first images) and a second set of images (e.g., second images), and the filter 330 partitions the frames of interest from other images such that the other images are not transmitted to the remote device. In some examples, the mobile device 202 is configured to transmit the frames of interest to the remote device via a network 206 (shown in FIG. 2).

For example, a relatively low-complexity image classification stage may occur at the mobile device 202 to at least partially understand the images such that one or more relevant images may be selected for transmission to the server 204. A local image classification algorithm may be programmable to detect images that show or include one or more objects of interest, image characteristics, etc. In some examples, the detection of one or more objects of interest and/or image characteristics occur based on one or more factors and/or policies. For example, the image-classification stage may classify and transmit to the server 204 images of road signs, pedestrians, and/or potholes to improve navigation using ambient-aware devices on vehicles and not transmit other, less-relevant images.

In some examples, the mobile device 202 uses biased on-device image classifiers to manage resources between the mobile device 202 and the remote device. The on-device image classifiers are, in some examples, part of a local computation platform that include one or more processors 106 that preprocess images and/or frames as they stream in (e.g., receive a plurality of frames per second) and transmit the raw frames to a hardware-specialized accelerator (e.g., a dedicated image-classification engine) that performs image classification in an energy-efficient manner. The frames selected by the accelerator are then compressed by the processor 106 and streamed out to a remote platform (e.g., server 204) over a communication link.

Local buffering is utilized at various stages of processing to leverage the architectural elements described herein. In some examples, buffering data locally decreases or eliminates the need to re-fetch data from external memory, lowering memory bandwidth and/or local storage used. Additionally or alternatively, fine-grained parallel implementations are used within various processing elements of the accelerator. For example, many blocks involve a series of two-level vector reduction operations. The disclosed system employs arrays of specialized processing elements that are interconnected to exploit this computation pattern.

In at least some examples, the system is configured based on power and/or performance requirements of a given application. For example, a camera in a vehicle may have greater access to battery and computing resources with fewer size constraints than a smartphone. In that example, the configuration may be altered to optimize speed of performance without consideration for energy usage. Thus, the accelerator may be scaled to cater to the performance constraints of the system described herein and/or the energy constraints of the device.

In at least some examples, the remote device includes an image processor module configured to further process one or more images by recognizing or otherwise understanding the images. In turn, the remote device may communicate the results of the image processor module back to the mobile device 202. In this example, a relatively high-complexity stage (e.g., object recognition) may occur at the remote device where a full-scale image classification and/or understanding stages are implemented. In at least some examples, image classification and/or understanding operations are performed through the recognition of arbitrary objects. The relatively high-complexity stage may include more resource-intensive analysis of the image and/or may consume a relatively high amount of resources. In at least some examples, one or more images may be understood by the remote device to provide a user (e.g., user 101) with hyper-local advertising, navigational aid, general information, etc. In some examples, more than one image is identified and/or processed in parallel with other images.

Figure 4:
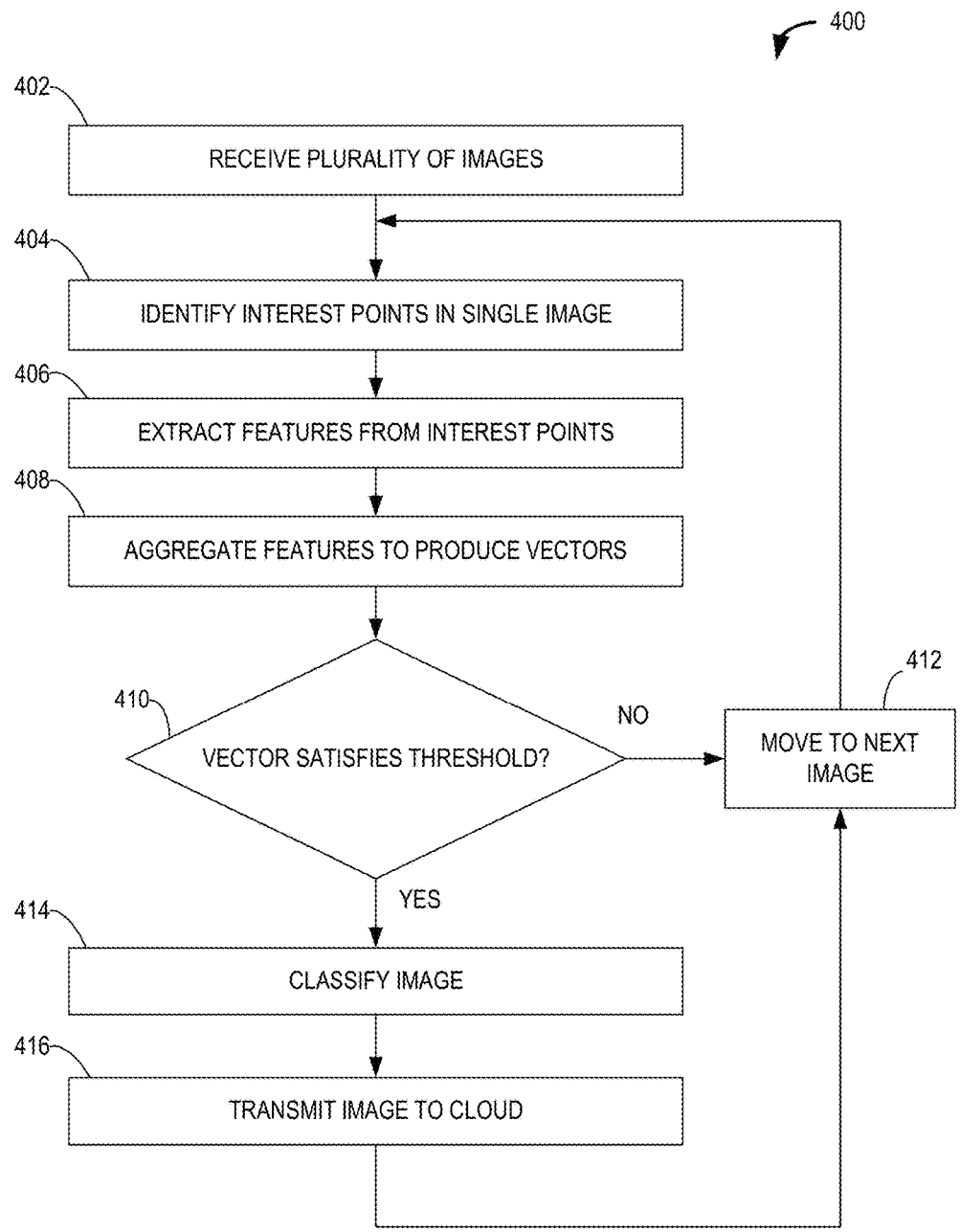
FIG. 4 is a flowchart of an example method for processing one or more images in an environment, such as the environment shown in FIG. 2.

FIG. 4 illustrates a method of implementing an image classification algorithm 400 on the disclosed hardware architecture (e.g., mobile device 202). In some examples, a plurality of images are generated and/or received at a mobile device 202, which includes an image classification module that implements a relatively simple algorithm to classify the images and transmit at least some of the images to a remote device (e.g., a server 204) configured to implement a relatively complex algorithm to further process and/or understand at least some of the images.

At 402, the mobile device 202 receives an image or a plurality of images, such as a video. In one example, the mobile device 202 may generate the images through its image sensor 310 (shown in FIG. 3). The image sensor 310 detects one or more objects and generates one or more images and/or frames based on the objects. Additionally or alternatively, one or more images may be received from another source, such as through text message, email, chat feature, the Internet, etc.

One or more interest points are identified in a single image at 404. One or more features are extracted from the identified interest points at 406. At 408, the extracted features are aggregated to produce one or more vectors. It is determined at 410 whether the vectors satisfy a predetermined threshold. That is, in at least some examples, it is determined whether the feature is associated with an object of interest. When the vectors do not satisfy the predetermined threshold at 410, the mobile device 202 moves to the next image at 412 and restarts the process by identifying one or more interest points for the next image at 404.

When the vectors satisfy the predetermined threshold at 410, the image is classified based on the vectors at 414. At 416, classified images are transmitted to a remote device (e.g., server 204), where resource-intensive, high complexity operations, such as image understanding, may be performed. The mobile device 202 then moves to the next image at 412 and restarts the process by identifying one or more interest points for the next image at 404. In at least some examples, the algorithm is biased to falsely determine that a feature is associated with an object of interest (e.g., a false positive).

Figure 5:
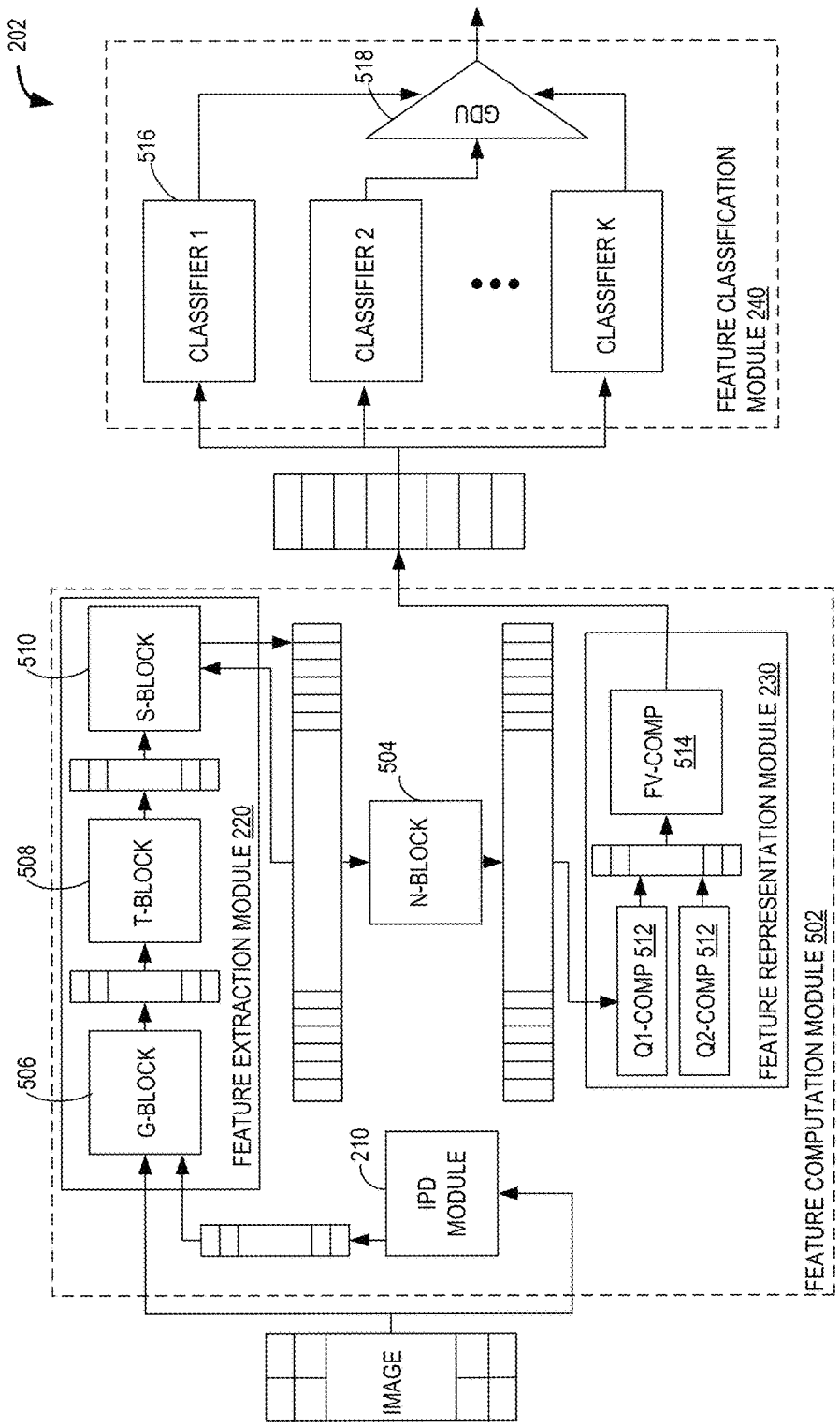
FIG. 5 is a block diagram of an example layout of component modules that may be used with a portable device, such as the portable device shown in FIG. 2.

FIG. 5 is an illustration of a component module layout of the mobile device 202. An image classification algorithm operates on a plurality of computational blocks or modules including a feature computation module 502 and a feature classification module or support vector machine (SVM) 240. In some examples, the feature computation module 502 includes a plurality of computational blocks or modules including an interest point-detection (IPD) module 210 configured to identify one or more interest point, a feature-extraction (FE) module 220 configured to extract one or more features, a normalizer module or N-Block 504 configured to normalize features, and a feature-representation (FV) module 230 configured to generate a vector of constant dimensionality. The FE module 220 may include a plurality of computational blocks or modules including a filter module or G-Block 506, a gradient module or T-Block 508, and a pooler module or S-Block 510. In at least some examples, the FE module 220 includes the N-Block 504 and/or an E-Block (not shown). The FV module 230 includes a plurality of computational blocks or modules including an array of Q-compute elements 512 and an array of Fisher vector (FV)-compute elements 514. The SVM 240 includes a plurality of computational blocks or modules including an array of classifiers 516 and a global decision unit (GDU) 518. Although one arrangement of modules is described, the modules may be arranged in any manner that enables the mobile device 202 to function as described herein.

The image classification algorithm is biased to be energy efficient and to have a relatively high false positive rate. In at least some examples, it is more efficient to implement a biased, less-complex algorithm (e.g., algorithm B*) and over-transmit images (e.g., transmit true positives and false positives) than it would be to implement a more-complex algorithm to distinguish the true positives from the false positives. The amount of energy algorithm B* saves, end-to-end, depends on how simple algorithm B* is in comparison to the more-complex algorithm. For example, where algorithm B* has a computational energy cost of 40 mJ/frame, end-to-end energy savings are achievable as long as a frame transmission rate (% FT) is ≤40% (e.g., for every five images, two or fewer images are transmitted to the remote device). Thus, if a frame-of-interest rate is 10% (e.g., for every ten images, one image includes a predetermined object of interest), the system may accommodate a false-positive rate of 30% (e.g., for every ten images, three images that do not include a predetermined object of interest may be transmitted to the remote device and still result in an end-to-end energy savings). Where algorithm B* has a computational energy cost of 5 mJ/frame, end-to-end energy savings are achievable as long as the % FT is ≤94%. Thus, if the frame-of-interest rate is 10%, the system may accommodate a false-positive rate of 84% and still result in an end-to-end energy savings. For ambient-aware applications, increasing the true positive rate at the expense of increasing the false positive rate is desired as to decrease the likelihood or probability of missing one or more frames that include or are associated with one or more predetermined objects of interest while keeping the associated computational energy cost relatively low. In other words, it is desired for the mobile device 202 to transmit less-relevant images than to omit or forego transmitting more-relevant images. In at least some examples, the image classification module is biased such that the all true positives are transmitted to the remote device with one or more false positives (e.g., no true positives are not transmitted to the remote device).

Interest Point Detection

Figure 6:
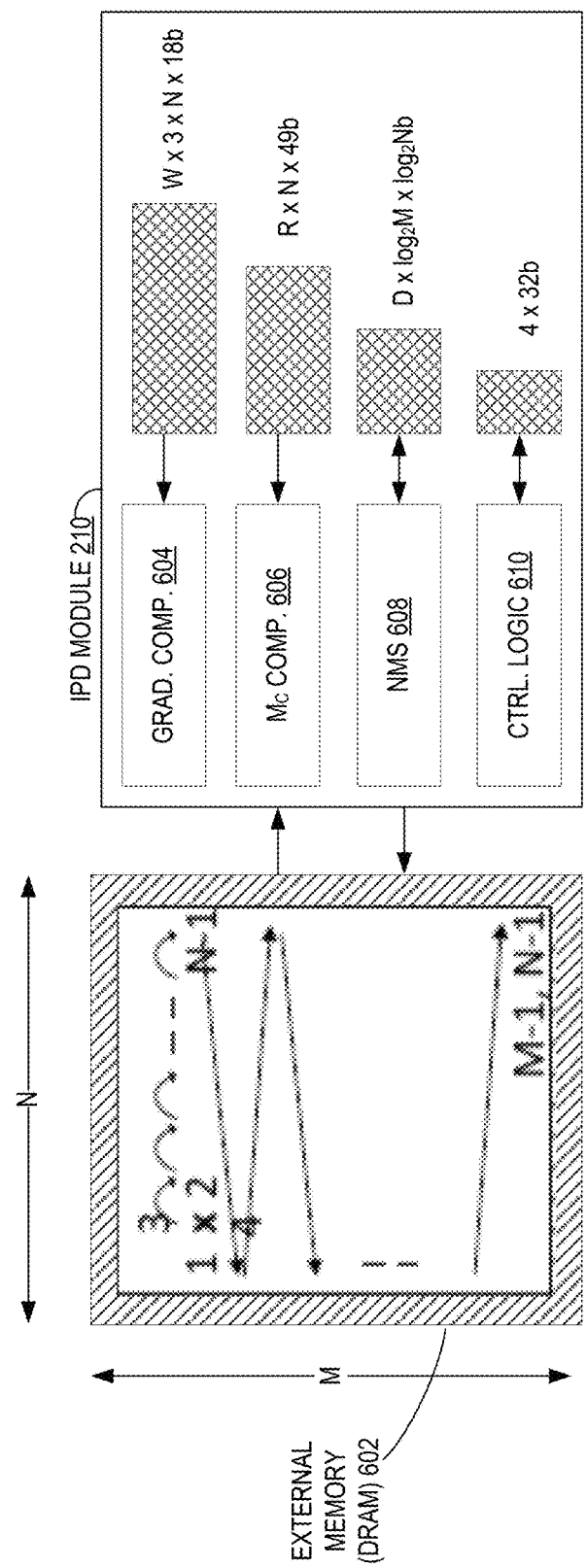
FIG. 6 is a block diagram of an example interest point-detection module that may be used with a portable device, such as the portable device shown in FIG. 2.

FIG. 6 is an illustration of an IPD module 210 configured to implement an IPD algorithm such that one or more pixels including or associated with relevant information (e.g., an interest point) may be identified. An interest point may be, for example, a corner, arch, edge, blob, ridge, texture, color, differential, lighting change, etc. in an image. The system described herein may utilize the Harris-Stephens algorithm, which detects pixels associated with object corners. Additionally or alternatively, any algorithm that any interest point may be used. In some examples, a policy that allows the interest point detection to change based on preceding image detection is utilized. For instance, if a pattern of images is identified, an algorithm associated with or particular to the images in the identified pattern may be selected.

An interest point includes or is associated with, in some examples, multiple pixels. In other examples, the interest point includes or is associated with only a single pixel. A predetermined number (e.g., four) of neighboring or abutting pixels may be retrieved or fetched with each pixel associated with an interest point. In some examples, the pixels (e.g., 8 b/pixel) are retrieved from external memory 602 using an address value that is generated by the IPD module 210. Thus, an external memory bandwidth for this operation is 4 MN×8 b/frame, where M and N are the height and width, respectively, of the grayscale frame. For video graphics array (VGA) resolution at 30 fps, the bandwidth is 281 Mbps and, for 720 p high definition (HD) resolution at 60 fps, the bandwidth is 1.6 Gbps. These figures are relatively modest since typical double data rate type three synchronous dynamic random-access memories (DDR3 DRAMs) provide a peak bandwidth of up to several 10s of Gbps.

In some examples, the abutting pixels are used to compute gradients along the horizontal and/or vertical directions at 604, which are buffered into a local first-in, first-out (FIFO) memory of size W×3×N×18b (in a nominal implementation W=3 and the memory is of size 12.7 kB for VGA and 25.3 kB for 720p HD). These gradients are used to evaluate a corner measure ($M_c$) at 606. The data path includes one CORDIC-based (COordinate Rotation DIgital Computer) divider. The resulting corner measures are put in a local FIFO of depth R (e.g., 3). This FIFO is thus of size 9.8 kB for VGA and 19.5 kB for 720 p HD. The $M_c$ values are processed by a non-maximum suppression (NMS) block at 608, which pushes the identified interest point locations (x and/or y coordinates) onto another local FIFO of depth D at 610. Thus, the FIFO capacity may be equal to 5.2 kB for VGA and 6.1 kB for 720p HD. When all pixels are accessed from the external memory 602, the IPD module 210 consumes approximately 70.31 Mbps for VGA, 0.46 Gbps for 1080p, and approximately 1.85 Gbps for 4 k image resolutions at 30 fps.

Figure 7:
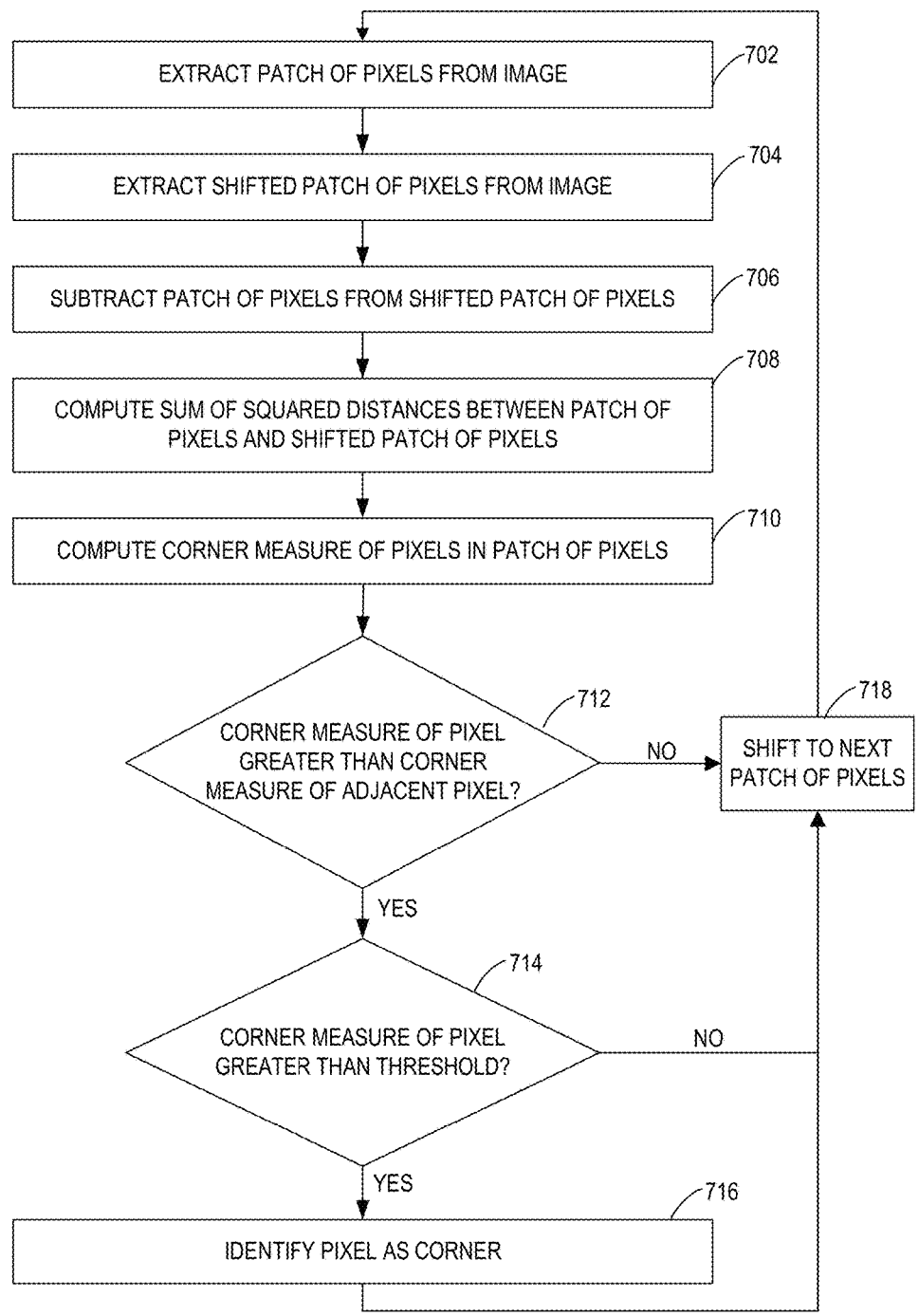
FIG. 7 is a flowchart of an example method for detecting one or more interest points using an interest point-detection module, such as the interest point-detection module shown in FIG. 6.

FIG. 7 illustrates a method illustrating operations that may be implemented by the IPD module 210 to identify or detect one or more interest points in one or more images and/or frames. At 702, a patch of pixels I(x, y) is extracted around each pixel location (x, y) in a grayscale frame I. A shifted patch of pixels I(x+u, y+v) is extracted around each pixel location (x+u, y+v) in the grayscale frame I at 704. The original extracted patch of pixels I(x, y) is subtracted from the shifted patch I(x+u, y+v) at 706. At 708, the result is used to compute the sum-of-squared distances [denoted by S(x, y)] using Equation 1 shown below:

$$S(x,y) = \Sigma_u \Sigma_v w(u,v) [I(u+x, v+y) - (u,v)]^2 \quad (1)$$

where w(u, v) is a window function (matrix) that contains a set of weights for each pixel in the frame patch. The weight matrix may include a circular window of Gaussian (isotropic response) or uniform values. For example, the system described herein utilizes uniform values to simplify implementation. A corner is then characterized by a large variation of S(x, y) in all directions around the pixel at (x, y). In order to aid the computation of S(x, y), the algorithm exploits a Taylor series expansion of I(u+x, v+y) as shown in Equation 2 below:

$$I(u+x, v+y) \approx I(u,v) + I_x(u,v)x + I_y(u,v)y \quad (2)$$

where $I_x(u, v)x$ and $I_y(u, v)y$ are the partial derivatives of the image patch I at (u, v) along the x and y directions, respectively. Based on this approximation, S(x, y) may be expressed as shown in Equations 3a and 3b below:

$$S(x,y) \approx \Sigma_u \Sigma_v w(u,v) \cdot [I_x(u,v) \cdot x - I_y(u,v) \cdot y]^2 \quad (3a)$$

$$S(x,y) \approx [x,y] A [x,y]^T \quad (3b)$$

where A is a structure tensor that is given by Equation 4 shown below:

$$\begin{vmatrix} <I_x^2> & <I_x I_y> \\ <I_x I_y> & <I_y^2> \end{vmatrix} \quad (4)$$

To conclude that (x, y) is a corner location, the eigenvalues of A are computed. However, since computing the eigenvalues of A is computationally expensive, at 710, the following corner measure Mc'(x, y) is computed, that approximates the characterization function based on the eigenvalues of A as shown in Equation 5 below:

$$M_c'(x,y) = \det(A) - \kappa \cdot \text{trace}^2(A) \quad (5)$$

To increase efficiency, the disclosure does not set the parameter K, and instead uses a modified corner measure $M_c(x, y)$, which amounts to evaluating the harmonic mean of the eigenvalues as shown in Equation 6 below:

$$M_c(x,y) = 2 \cdot \det(A) / [\text{trace}(A) + \varepsilon] \quad (6)$$

where ε is a small arbitrary positive constant (that is used to avoid division by zero). After computing a corner measure [$M_c(x, y)$] at each pixel location (x, y) in the frame, the corner measure of each pixel is compared to the corner measure of one or more abutting or adjacent pixels in the patch at 712. If a pixel has a corner measure that is greater than a corner measure of each abutting or adjacent pixel or, in some examples, a corner measure of the other pixels in the patch of pixels, then it is compared to a predetermined threshold at 714. If it satisfies both criteria, the pixel is marked or identified as a corner at 716. This process is called non-maximum suppression (NMS). The corners thus detected are invariant to lighting, translation, and rotation. If none of the examined pixels in the patch of pixels are identified as corners, then the next patch of pixels is extracted at 718, and the process begins for the next patch of pixels at 702. In some examples, this process occurs iteratively until the entire image is examined. In other examples, when an image is identified and classified before the entire image is examined, the process may be terminated.

Feature Extraction

Figure 8:
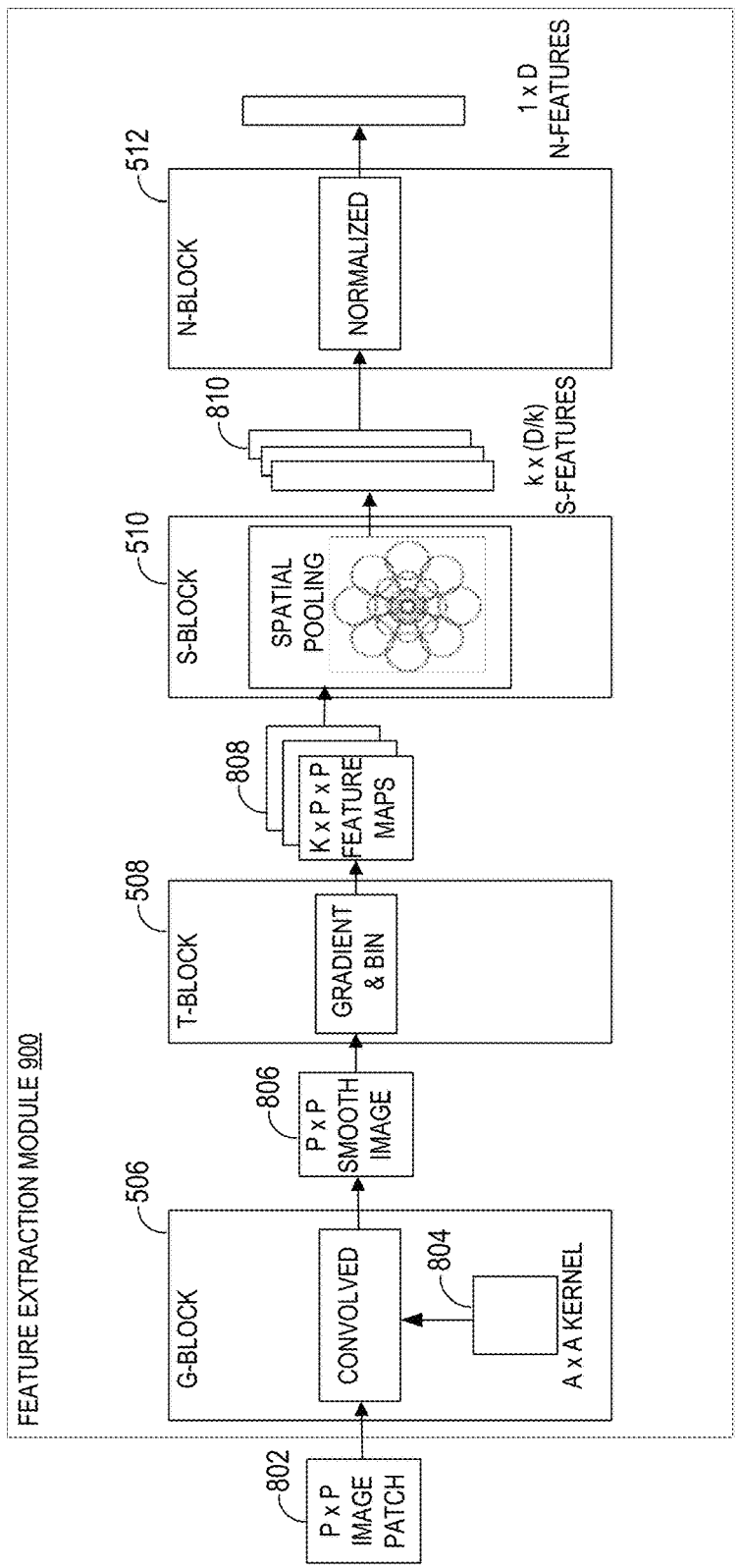
FIG. 8 is a block diagram of an example feature-extraction module that may be used with a portable device, such as the portable device shown in FIG. 2.
Figure 9:
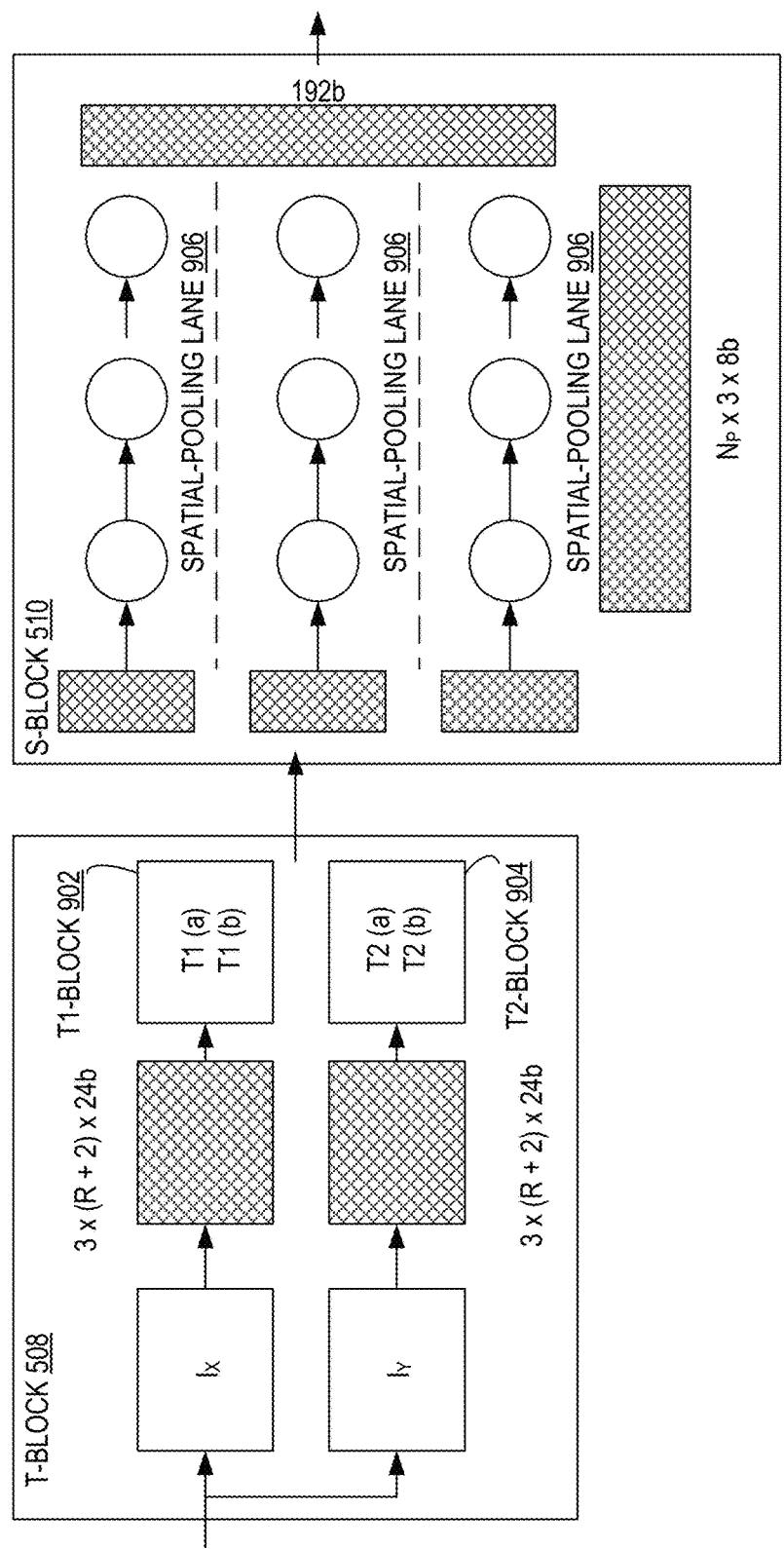
FIG. 9 is a block diagram of example sub-modules that may be used with a feature-extraction module, such as feature-extraction module shown in FIG. 8.

FIG. 8 is an illustration of a feature-extraction (FE) module 220 configured to implement a feature-extraction algorithm, such that one or more low-level features may be extracted from pixels around the interest points (e.g., the corners identified in the interest point-detection operation). Typical image classification algorithms use histogram-based feature-extraction methods, such as scale-invariant feature transform (SIFT), histogram oriented gradient (HoG), gradient location and orientation histogram (GLOH), etc. The FE module 220 enables a computation engine using a modular framework to represent or mimic many other feature-extraction methods depending on tunable algorithmic parameters that may be set at run-time. As shown in FIG. 8, the FE module 220 includes a G-Block 506, a T-Block 508, an S-Block 510, an N-Block 504, and/or an E-Block (not shown). FIG. 9 is a detailed illustration of the T-Block 508 and the S-Block 510.

In some examples, different candidate blocks are swapped in and out to produce new overall descriptors. In addition, parameters that are internal to the candidate features may be tuned in order to increase the performance of the descriptor as a whole. In this example, the FE module 220 is pipelined to perform stream processing of pixels. The feature-extraction algorithm includes a plurality of processing operations that are heavily interleaved at the pixel, patch, and frame levels.

The filter module or G-Block 506 includes pre-smoothing capabilities configured to smooth a P×P image patch of pixels 802 around each interest point by convolving the image patch of pixels 802 with a two-dimensional Gaussian filter 804 (e.g., a kernel) of standard deviation ($\sigma_s$). In one example, the image patch of pixels 802 is convolved with a filter 804 having dimensions A×A. This results in a smoothened P×P image patch of pixels 806. The number of rows and/or columns in the G-Block 506 may be adjusted to achieve a desired energy and throughput scalability.

The gradient module or T-Block 508 includes transformation capabilities configured to map the P×P smoothened patch of pixels 806 onto a length k vector with non-negative elements. At a high level, the T-Block 508 generates an output array of k feature maps 808, each of size P×P.

The pooler module or S-Block 510 includes spatial-pooling capabilities configured to accumulate weighted vectors from the T-Block 508 to generate N linearly summed vectors 810 of length k. These N vectors are concatenated to produce a descriptor of length kN.

The normalize module or N-Block 504 includes post-normalization capabilities configured to remove descriptor dependency on image contrast. The output from the S-Block 510 is processed by the N-Block 504, which includes an efficient square-rooting algorithm and division module (e.g., based on CORDIC). In a non-iterative process, the S-Block 510 features are normalized to a unit vector (e.g., dividing by the Euclidean norm) and all elements above a threshold are clipped. The threshold is defined, in some examples, depending on the type of ambient-aware application operating on the mobile device 202 or, in other examples, the threshold is defined by policies set by a user (e.g., user 101), the cloud, and/or an administrator. In some examples, a system with higher bandwidth, or more cost effective transmission, may set the threshold lower than other systems. In an iterative process, these operations repeat until a predetermined number of iterations has been reached.

In at least some examples, the FE module 220 includes an embedding or E-block (not shown) configured to reduce the feature vector dimensionality. The E-Block may include one or more sub-stages: principal component analysis (E1), locality preserving projections (E2), locally discriminative embedding (E3), etc. In one example of the present disclosure, the E-block is utilized to provide an option for extensibility.

Data precisions are tuned to increase an output signal-to-noise-ratio (SNR) for most images. The levels of parallelism in the system, the output precisions, memory sizes etc. may all be parameterized in the code. Assuming no local data buffering between the IPD module 210 and FE module 220, the feature-extraction block (for nominal ranges) consumes (assuming 64×64 patch size and 100 interest points) approximately 1.2 kB (4×4 two-dimensional array and 25 pooling regions) for a frame resolution of VGA (128×128 patch size and 100 interest points) and approximately 3.5 kB (8×8 two-dimensional array and 25 pooling regions) for a frame resolution of 720 p HD. Local buffering between the IPD module 210 and FE module 220 enable those elements to work in a pipelined manner and, thus, mask the external data access bandwidth. The total estimated storage capacity for the IPD module 210 and the FE module 220 are approximately 207.38 kB for VGA, 257.32 kB for 1080 p, and approximately 331.11 kB for 4 k image resolutions.

FIG. 9 is a detailed illustration of the T-Block 508 and the S-Block 510. The T-Block 508 includes one or more sub-blocks defined for the transformation. For example, the T-Block 508 may include a T1-Block 902, a T2-Block 904, a T3-Block, and a T4-Block.

T1-Block 902 computes gradients at each pixel location (x, y) along both horizontal ($\Delta x$) and vertical ($\Delta y$) directions. The magnitude of the gradient vector is then apportioned into k bins (where k equals 4 in T1 (a) and 8 in T1 (b) mode), split equally along the radial direction—resulting in an output array of k feature maps 808 (shown in FIG. 8), each of size P×P.

T2-Block 904 quantizes the gradient vector in a sine-weighted fashion into 4 (T2 (a)) or 8 (T2 (b)) bins. For T2 (a), the quantization is done as follows: $|\Delta_x|-\Delta_x$; $|\Delta_x|+\Delta x$; $|\Delta_y|-\Delta y|\Delta_y$; $|\Delta_y|+\Delta y$. For T2 (b), the quantization is done by concatenating an additional length 4 vector using $\Delta_{45}D45$, which is the gradient vector rotated through 45 degrees.

T3-Block applies steerable filters at each pixel location (x, y) using n orientations, and the response is computed from quadrature pairs. The result is quantized in a manner similar to T2 (a) to produce a vector of length k=4n (T3 (a)), and in a manner similar to T2 (b) to produce a vector of length k=8n (T3 (b)). In some examples, filters of second or higher-order derivatives and/or broader scales and orientations are used in combination with the different quantization functions.

T4-Block computes two isotropic difference of Gaussian (DoG) responses with different centers and scales (effectively reusing the G-Block 506. These two responses are used to generate a length k=4 vector by rectifying the positive and negative parts into separate bins as described for the T2-Block 904.

In one example, only the T1-Block 902 and T2-Block 904 are utilized. For example, the data path for the T-Block 508 includes gradient-computation and quantization engines for the T1 (a), T1 (b), T2 (a), and T2 (b) modes of operation. In another example, T3 and T4 are also utilized. In some examples, various combinations of T1-Block 902, T2-Block 904, T3-Block, and T4-Block are used to achieve different results. The T-Block 508 outputs are buffered in a local memory of size 6(R+2)×24b and the pooling region boundaries are stored in a local static random-access memory (SRAM) of size 3Np×8b.

The S-Block 510 includes a configurable number of parallel lanes 906 for the spatial-pooling process. These lanes 906 include comparators that read out $N_p$ pooling region boundaries from a local memory and compare with the current pixel locations. The power consumption and performance of the S-Block 510 may be adjusted by varying a number of lanes 906 in the S-Block 510.

The S-Block 510 is configured to accumulate the weighted vectors from the T-Block 508 to give N linearly summed vectors 810 of length k. These N vectors are concatenated to produce a descriptor of length kN. In the S-Block 510, there are a configurable number of parallel lanes 906 for the spatial-pooling process. These lanes 906 include comparators that read out $N_p$ pooling region boundaries from a local memory and compare with the current pixel locations. The power consumption and performance of the S-Block 510 may be adjusted by varying a number of lanes 906 in the S-Block 510.

Figure 10:
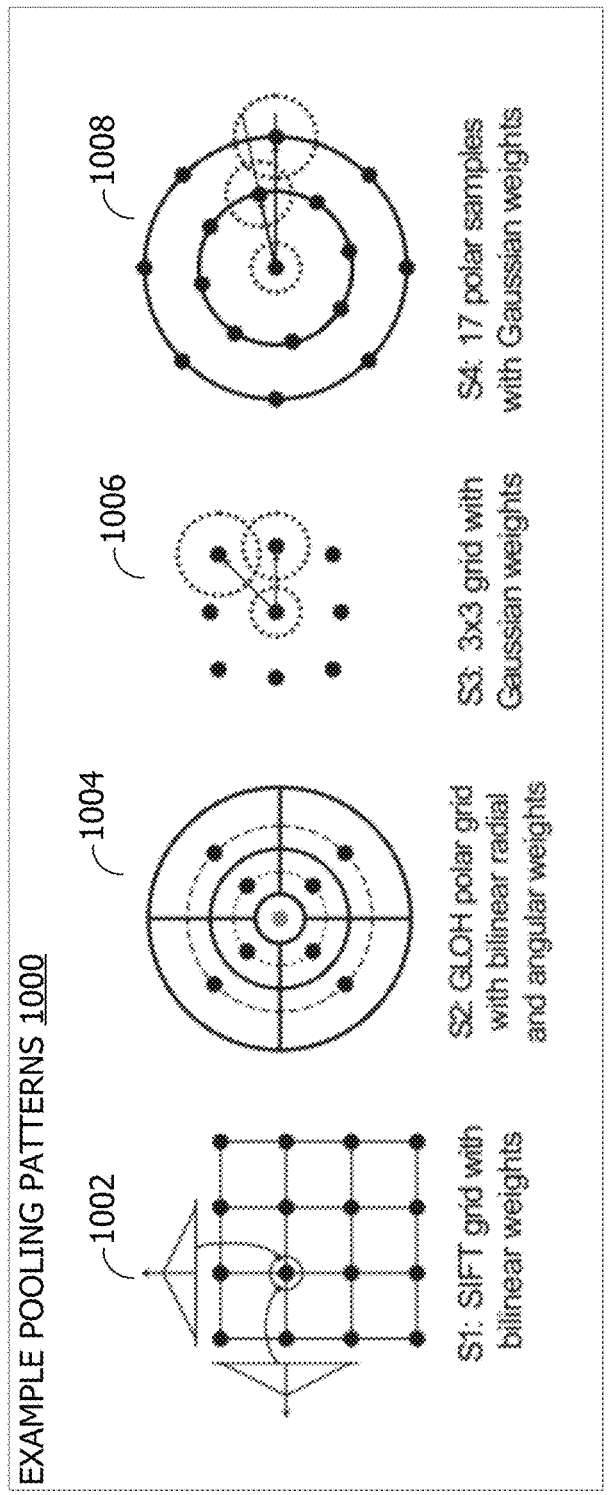
FIG. 10 illustrates example pooling patterns that may be used with a feature-extraction module, such as feature-extraction module shown in FIG. 8.

FIG. 10 illustrates various pooling patterns 1000 that are utilized by the S-Block 510 depending on the desired result. In one example 51, a square grid 1002 of pooling centers may be used. The overall footprint of this grid 1002 is a parameter. The T-Block 508 features are spatially pooled by linearly weighting them according to their distances from the pooling centers.

In another example S2, a spatial summation pattern 1004, similar to the spatial histogram used in GLOH, may be used. The summing regions are arranged in a polar arrangement. The radii of the centers, their locations, the number of rings, and the number of locations per angular segment are all parameters that may be adjusted (0, 4, or 8) to increase performance.

In yet another example S3, normalized Gaussian weighting functions are utilized to sum input regions over local pooling centers arranged in a 3×3, 4×4, or 5×5 grid 1006. The sizes and the positions of these grid samples are tunable parameters. In yet another example S4, a similar approach as example S3 is used, but with a polar arrangement 1008 of the Gaussian pooling centers instead of rectangular arrangement. In at least some examples, the patterns for spatial pooling are stored in an on-chip memory along the borders of a two-dimensional-array (described below), and the spatially-pooled S-Block 510 features are produced at the output. The number of spatial pooling lanes 906 in the S-Block 510 may be adjusted to achieve a desired energy and throughput scalability.

Feature Representation

Figure 11:
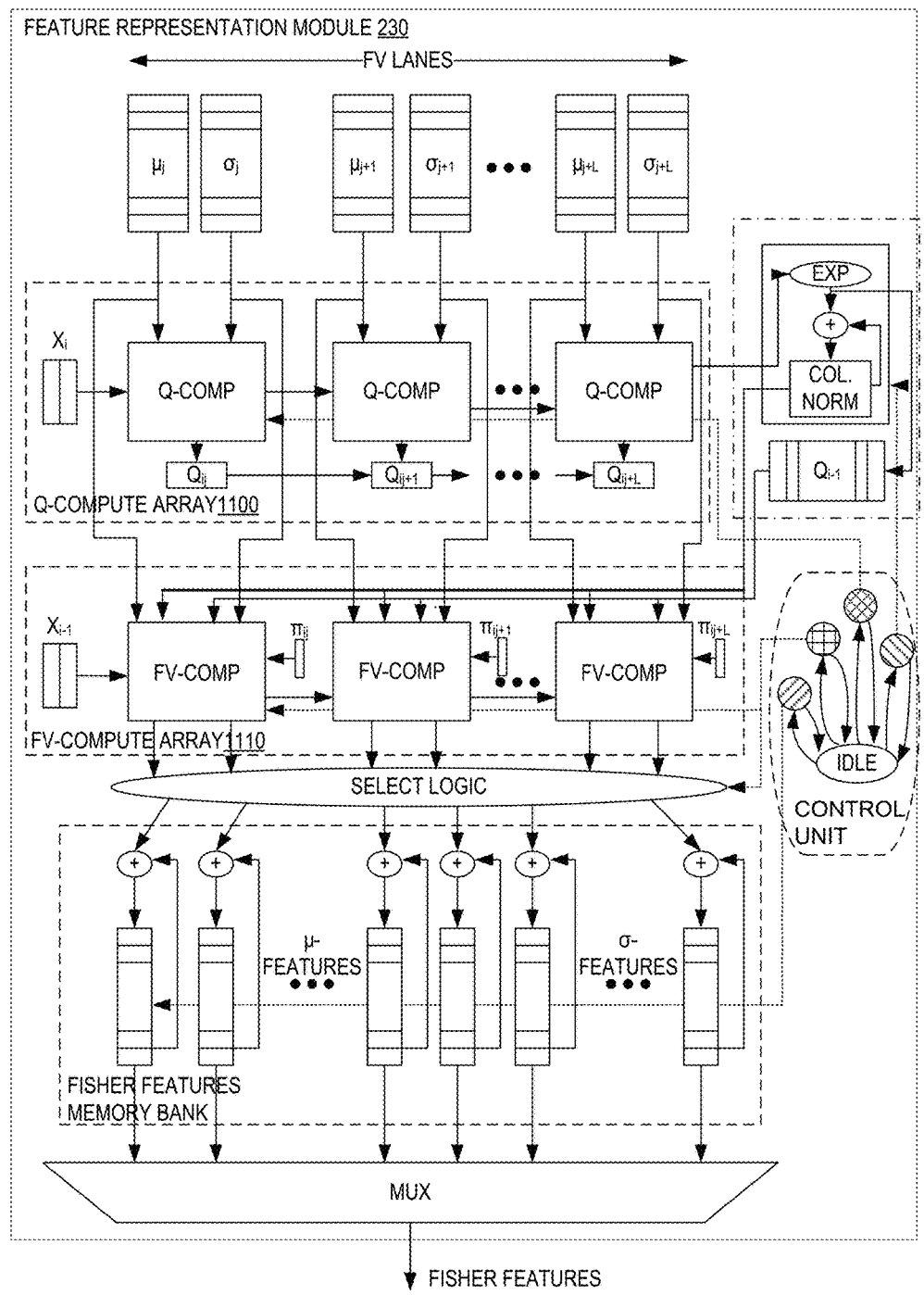
FIG. 11 is a block diagram of an example feature-representation module that may be used with a portable device, such as the portable device shown in FIG. 2.

FIG. 11 illustrates a feature-representation or FV module 230 configured to implement a feature-representation algorithm, such that a vector of constant dimensionality may be produced. There are several algorithmic options for high-level feature representation including the bag-of-visual words, fisher vectors (FV), etc. In this example, the system described herein uses FV. The FV representation provides high classification performance, due to a richer Gaussian mixture model (GMM)-based representation of the visual vocabulary. Additionally or alternatively, any other algorithm that provides high classification performance may be used.

In this example, the FV module 230 includes three processing elements, namely, Q-compute elements 512, FV-compute elements 514, and Q-norm compute elements. Parallelism is exploited across GMM clusters by ordering the Q and FV computations in an arrayed fashion (e.g., an array 1100 of Q-compute elements 512 and/or an array 1110 of FV-compute elements 514). The GMM parameters (e.g., m, s, and p) are stored in on-chip streaming memory elements. The daisy feature descriptors come in from the left, and are processed by the array 1100 of Q-compute elements 512 and the array 1110 of FV-compute elements 514. After one round of processing, the global feature memory is updated. This process is repeated across all GMM clusters. The number of GMM clusters is an algorithmic parameter that is fixed during the initial design-space exploration phase. To increase throughput, the GMM model parameters are shared across successive feature inputs in the Q-compute elements 512 and the FV-compute elements 514. This sharing also saves or preserves memory bandwidth.

The power and performance of the FV module 230 may be adjusted by varying the number of lanes in the processing element array.

In this example, let $I=(x_1, x_2, \ldots, x_T)$ be a set of T feature descriptors (e.g., the daisy features) extracted from an image each of dimensionality D. Let $\Theta=(\mu k, \Sigma_k, \phi_k, k=1, 2, \ldots, K)$ be the parameters of a GMM fitting the distribution of the daisy descriptors. The GMM associates each vector $x_i$ to a centroid k in the mixture with a strength given by the posterior probability as shown in Equation 7 below:

$$q_{ik} = \frac{\exp\left[-\frac{1}{2}(x_i - \mu_k)^T \Sigma_k^{-1}(x_i - \mu_k)\right]}{\sum_{t=1}^{K} \exp\left[-\frac{1}{2}(x_i - \mu_k)^T \Sigma_k^{-1}(x_i - \mu_t)\right]} \tag{7}$$

For each centroid k, the mean (ujk) and covariance deviation (vjk) vectors are defined as shown in Equations 8 and 9 below:

$$\mu_{jk} = \frac{1}{T\sqrt{\pi_k}} \sum_{i=1}^{T} q_{ik} \frac{x_{ji} - \mu_{jk}}{\sigma_{jk}} \tag{8}$$

$$v_{jk} = \frac{1}{T\sqrt{2\pi_k}} \sum_{i=1}^{T} q_{ik} \left[\left(\frac{x_{ji} - \mu_{jk}}{\sigma_{jk}}\right)^2 - 1\right] \tag{9}$$

where j=1, 2, . . . , D spans the vector dimensions. The FV of an image I is the stacking of the vectors $u_k$ and then of the vectors $v_k$ for each of the K centroids in the Gaussian mixtures as shown in Equation 10 below:

$$FV(I) = [\ldots u_k \ldots v_k \ldots]^T \tag{10}$$

To improve classification performance of the images, the FVs are normalized using, for example, the Q-norm compute elements. This is achieved by reassigning each dimension z of an FV to be $|z|^\alpha \text{sign}(z)$, where $\alpha$ is a design parameter that is optimized to limit the dynamic range of the normalized FVs. The FVs are normalized a second time using, for example, the Q-norm compute elements by dividing each dimension by the $l^2$ norm. The normalized FVs thus produced are global feature vectors of size 2 KD.

Feature Classification

Figure 12:
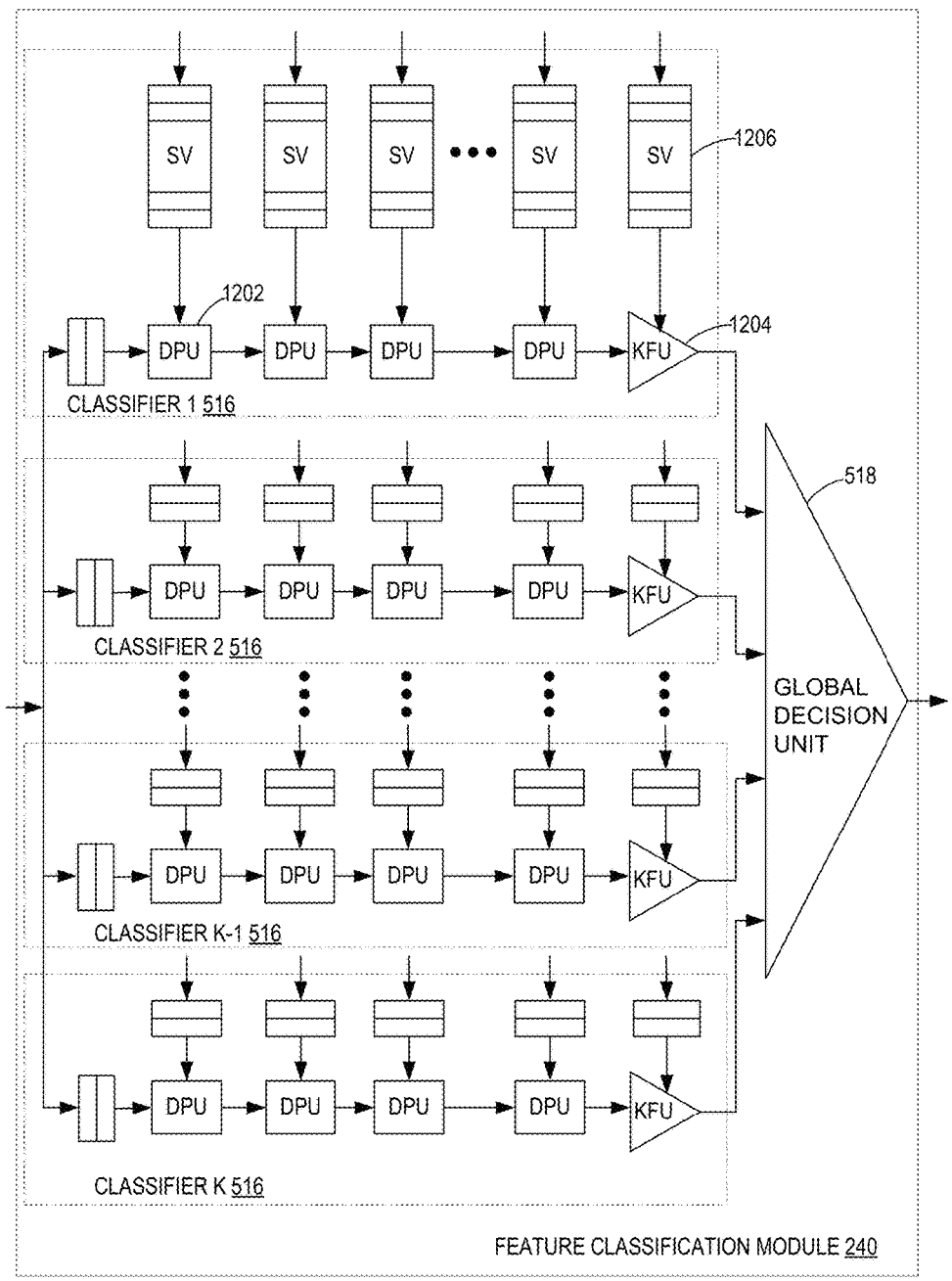
FIG. 12 is a block diagram of an example support vector machine that may be used with a portable device, such as the portable device shown in FIG. 2.

FIG. 12 illustrates a feature-classification module or support vector machine (SVM) 240 including an array of classifiers 516 configured to implement a feature-classification algorithm, such that relevant frames may be detected or identified.

To keep the computational costs low, the SVM 240 is a simple margin-based classifier. The SVM 240 helps detect relevant frames based on a model that is learned offline using prelabeled data during a training phase. The SVM 240 includes two types of processing elements (PEs), namely, the dot-product unit (DPU) 1202 and the kernel-function unit (KFU) 1204. The DPU 1202 and/or the KFU 1204 realize a distance computation. Support vectors (SVs) 1206, which represent the trained model, are stored in a streaming memory bank along the borders of the DPU 1202 array. During on-line classification, the DPUs 1202 perform a first vector reduction between the feature descriptors and the SVs 1206 to compute the dot products. After this, the dot products are streamed out to the KFU 1204, where the kernel function (representing a second vector reduction) and the distance score is computed.

In some examples, only linear and polynomial kernels are utilized. In other examples, other kernels are used. Finally, the distance score is used by the global decision unit (GDU) 518 to compute the classifier output. Each of the previous operations is independent and may be parallelized. The execution time of the SVM 240 is proportional to the number of DPU 1202 units (e.g., SVM lanes).

In SVM 240, a set of vectors (total Nsv vectors) (e.g., SVs 1206) determine a decision boundary. During online classification, the FV is used to compute a distance score (Ds) as shown in Equation 11 below:

$$D_S = \Sigma_{i=1}^{N_{sv}} K(FV \cdot sv_i) \alpha_i y_i - b \quad (11)$$

where $sv_i$ is the $i^{th}$ support vector; b, $\alpha_i$ and $y_i$ are training parameters and the function $K(\cdot)$ is the kernel function, which is a design parameter. In this example, polynomial kernels are selected (up to order 3), which are defined as shown in Equation 12 below:

$$K(FV \cdot sv_i) = (FV \cdot sv_i + \beta)^d \quad (12)$$

where d and β are training parameters. Based on the sign of Ds, an FV is assigned to either the positive (object of interest) or the negative class. To bias the classifier towards having a high true positive rate at the cost of an increased false positive rate, the decision boundaries are modified using the various training parameters.

When a FV satisfies a threshold, which is set, in some examples, by an ambient-aware application on the device or, in other examples, by a policy on the cloud, the image associated with the FV is classified. A classified image is, in some examples, transmitted to a remote device (e.g., server 204) that is configured to implement a relatively complex algorithm (e.g., an image-understanding algorithm) to further understand and/or utilize the image. The biasing algorithm described herein facilitates maintaining a high accuracy of images sent to the server 204 while maintaining low energy costs.

Data Level Parallelism

Figure 13:
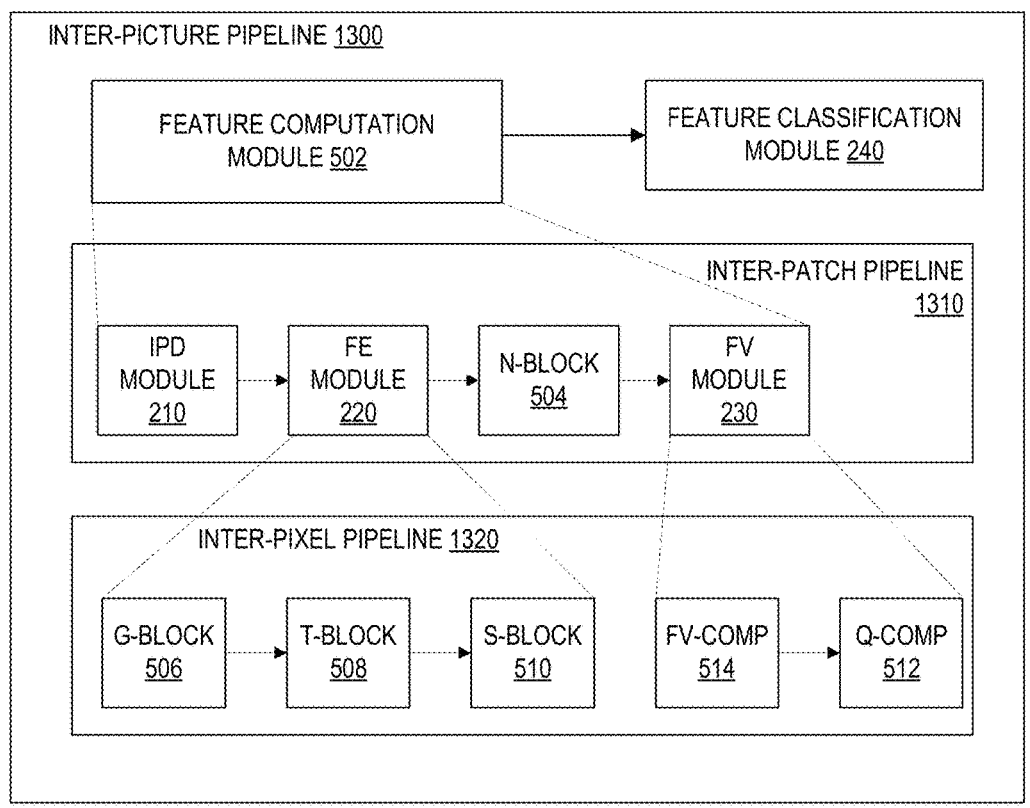
FIG. 13 is a block diagram of an example hierarchically-pipelined architecture that may be used with a portable device, such as the portable device shown in FIG. 2.

FIG. 13 illustrates a three-tiered, hierarchically-pipelined architecture that may be used by the system described herein. The first tier, which includes the feature computation module 502 and the SVM 240, is the inter-picture pipeline 1300. In this example, the feature computation module 502 includes the IPD module 210, the FE module 220, the N-Block 504, and the FV module 230. Alternatively, the feature computation module 502 may include any combination of modules that enables the mobile device 202 to function as described herein. In the inter-picture pipeline 1300, parallelism is utilized across successive input video or image frames. While global features of a frame "I" are being computed, a previous frame e.g., I–1 is concurrently processed by the classifier.

The second tier or pipeline, which includes the FE module 220, is the inter-patch pipeline 1310. Parallelism is utilized within each feature-computation stage of the inter-picture pipeline 1300. In the inter-patch pipeline 1310, image patches around different interest points may be processed concurrently. In this example, the second tier includes the IPD module 210, the FE module 220, the N-Block 504, and the FV module 230. Interest points that are detected by the IPD module 210 are pushed onto a first-in first-out (FIFO) memory, which are then utilized by the FE module 220 to compute S-Block features. The S-Block features are normalized by the N-Block 504 to produce full local descriptors at that interest point. The normalized vectors are consumed by the FV module 230, which iteratively updates the global feature memory. In at least some examples, the entire process is repeated until the local memory is empty. In this example, the FE module 220 includes the G-Block 506, the T-Block 508, and the S-Block 510. Alternatively, the FE module 220 may include any combination of modules that enables the mobile device 202 to function as described herein.

Parallelism is utilized within two blocks of the second tier or inter-patch pipeline 1310. Specifically, component blocks of the FE module 220 (e.g., the G-Block 506, the T-Block 508, and the S-Block 510) form the third tier or pipeline, the inter-pixel pipeline 1320. Additionally or alternatively, component blocks of the FV module 230 utilize parallelism, for example, in the arrays of the Q-compute elements 512 and the FV-compute elements 514.

Figure 14:
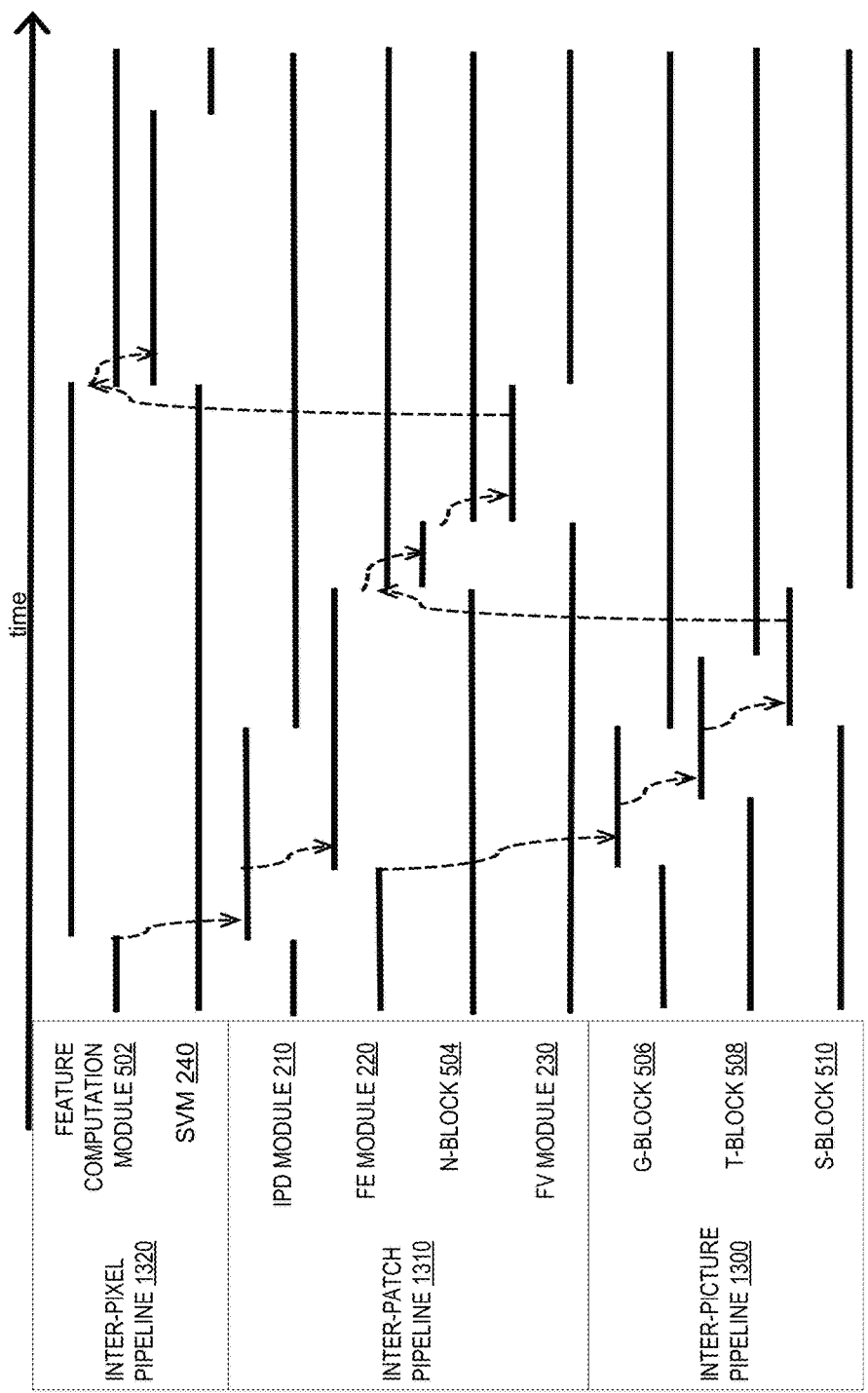
FIG. 14 is a sequence diagram of a hierarchically-pipelined architecture, such as the hierarchically-pipelined architecture shown in FIG. 13.

FIG. 14 illustrates a sequence diagram of the hierarchically-pipelined architecture. The feature computation module 502 and/or the SVM 240 includes a plurality of submodules (e.g., IPD module 210, FE module 220, N-Block 504, FV module 230, G-Block 506, the T-Block 508, and the S-Block 510) that are each configured to process a first set of data to generate a first output and transmit the first output to another submodule upon completion such that the submodule is configured to process a second set of data in parallel with the other submodule processing the first output received from the submodule.

To increase throughput, execution cycles are balanced across the tiers of the pipeline. In at least some examples, the execution time of each block differs based on input data and/or other algorithmic parameters. For instance, a delay of the second tier may be proportional to a number of interest points, which varies across different video frames. In order to account for varying execution times of the blocks, in at least some examples, resource allocation is systematically configured for one or more blocks based on its contribution to the overall throughput. For example, when a block is determined to be clock cycle-intensive, it may be allocated more resources so that it does not slow down an overall flow of the pipeline.

Using the three-tiered, hierarchically pipelined architecture described herein enables multiple images, interest points, and/or pixels to be processed in parallel. In some examples, they may also be processed in series.

Benefits

The system described here enables at least some energy to be conserved or saved during operation. When configured to capture over 90% of interesting frames, the system described herein provides a 1.43×–3.04×(2.12× on average) improvement in system energy compared to a baseline system in a plurality of environments (e.g., Caltech256, NORB, PASCAL VOC, CamVid, GeoMean). This reduction comes, at least in part, due to the filtering of irrelevant frames at the mobile device 202, which saves or conserves valuable communication energy. The benefits improve when the coverage is reduced to –3.61×× and 5.12× on average when the system is configured to capture over 70-90% and 50-70% of interesting frames, respectively. Compared to the baseline, the system described herein contributes to about 14% of the overall system energy when the system is configured to capture over 90% of interesting frames. The energy contributions increase to 19% and 28% when the system is configured to capture over 70-90% and 50-70% of interesting frames, respectively. because the overall system energy is also decreased.

Energy benefits provided by the system described herein are bounded by a maximum number of frames that may be filtered out (e.g., frames of interest or FoI). At higher values of FoI, the savings due to the system described herein are lower. For instance, at ≥90% coverage, the savings reduce from 2.1× to 1.3× as FoI goes from 5 to 70%. However, FoIs are generally low (approximately 10% on average) and, thus, employing the system described herein for local data filtering may provide substantial benefits.

A range of emerging applications require mobile devices to be continually ambient aware. The systems described herein use a hybrid system that employs local computations for image classification and the cloud for more complex processing. Examples of the disclosure (e.g., specialized processing elements, parallel stages, and multi-tiered pipelines) enable effective and/or efficient image classification. The ability to scale performance and energy by adjusting various design parameters is also an attribute of the hardware architecture. A light-weight image-classification algorithm keeps the energy overhead low. The algorithm is biased to achieve high true positive rates at the cost of some extra false positives. This approach helps filter out a substantial number of frames from video data at the local device. The systems described herein enable faster image classification with a low energy cost (e.g., 3 mJ/frame). Using multiple levels of pipelining and other architectural innovations, the systems described herein achieve high performance and energy efficiency, which enables extending or prolonging battery lives of portable ambient-aware devices.

Example Environment

Example computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when configured to execute the instructions described herein.

The examples illustrated and described herein as well as examples not specifically described herein but within the scope of aspects of the disclosure constitute example means for efficiently biasing image classification on a portable device and performing resource-intensive image understanding on remote devices, as well as the hardware architecture for performing the classification algorithms. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C." Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

identifying one or more interest points in an image;

detecting one or more corners, wherein each corner corresponds to an interest point;

extracting one or more features from the identified interest points using one or more of a filter module, a gradient module, a pool module, and a normalizer module;

extracting one or more features from the plurality of images, a quantity of extracted features associated with a desired power consumption of the mobile device;

smoothing, by the filter module, one or more pixels associated with the interest points;

computing, by the gradient module, one or more gradients along a first axis and a second axis perpendicular to the first axis;

generating, by the gradient module, an output array including one or more feature maps;

generating the output array such that the output array includes a predetermined number of feature maps having a predetermined size;

pooling, by the pool module, one or more feature maps along a grid, wherein the feature maps correspond to the extracted features;

aggregating the extracted features to generate one or more vectors;

determining whether the extracted features satisfy a predetermined threshold;

classifying the image such that the image is configured to be processed based on the classification including one or more of recognizing the extracted features, understanding the image, and generating one or more actionable items;

a sensor module configured to capture data corresponding to one or more images;

a feature computation module configured to identify one or more interest points in the images, each interest point including one or more pixels;

a feature computation module configured to detect one or more corners, wherein each corner corresponds to an interest point;

a feature computation module configured to smooth the pixels;

a feature computation module configured to compute one or more gradients along a first axis and a second axis perpendicular to the first axis;

a feature computation module configured to generate an output array including a predetermined number of feature maps;

a feature computation module configured to pool one or more feature maps along a grid, wherein the feature maps correspond to the extracted features;

a feature computation module configured to extract one or more features from the identified interest points;

a feature computation module configured to aggregate the extracted features to generate one or more vectors;

a feature classification module configured to determine whether the extracted features satisfy a predetermined threshold;

a feature classification module configured to classify the images into a first set of images and a second set of images;

a feature classification module configured to transmit the first set of images to the server, the server configured to process the first set of images including one or more of recognize the extracted features, understand the images, and generate one or more actionable items;

a feature computation module and/or a feature classification module configured to process one image in parallel with processing another image;

a feature computation module configured to process an interest point in parallel with processing another interest point;

a feature computation module configured to process a pixel in parallel with processing another pixel; and a plurality of submodules, wherein a first submodule of the plurality of submodules is configured to process a first set of data to generate a first output and transmit the first output to a second submodule of the plurality of submodules such that the first submodule is configured to process a second set of data in parallel with the second submodule processing the first output.

In some examples, the operations illustrated in FIGS. 4 and/or 7 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method for classifying a plurality of images observed by a user, the method comprising executing on one or more computing devices the operations of:

identifying one or more interest points in each image of the plurality of images observed by the user;

extracting one or more features from the identified interest points using one or more of a filter module, a gradient module, a pool module, and a normalizer module;

aggregating the extracted features to generate one or more vectors;

based on the generated vectors, determining whether the extracted features satisfy a predetermined threshold;

based on the determination, classifying each image of the plurality of images observed by the user as a first image or a second image;

transmitting a set of first images, and not any of the second images, to a different computing system for processing, including one or more of recognizing the extracted features, understanding the set of first images, and generating one or more actionable items;

receiving, in response to the transmission of the set of first images, data related, in part, to the processed set of first images; and presenting, via a user interface, the received data to the user.

2. The computer-implemented method of claim 1, wherein identifying one or more interest points comprises detecting one or more corners in the image, wherein a first corner corresponds to a first interest point.

3. The computer-implemented method of claim 1, wherein extracting one or more features comprises smoothing, by the filter module, one or more pixels associated with the interest points.

4. The computer-implemented method of claim 1, wherein extracting one or more features comprises:

computing, by the gradient module, one or more gradients along a first axis and a second axis perpendicular to the first axis; and based on the computed gradients, generating, by the gradient module, an output array including one or more feature maps.

5. The computer-implemented method of claim 1, wherein extracting one or more features comprises pooling, by the pool module, one or more feature maps along a grid, wherein the feature maps correspond to the extracted features.

6. A mobile device comprising:
a sensor module configured to capture data corresponding to a plurality of images observed by a user;
a memory area storing computer-executable instructions for classifying the plurality of images observed by the user; and
a processor configured to execute the computer-executable instructions to:
extract one or more features from the plurality of images observed by the user, a quantity of extracted features associated with a desired power consumption of the mobile device;
determine whether the extracted features satisfy a predetermined threshold;
based on the determination, classify each of the plurality of images observed by the user as a first image or a second image;
transmit a set of first images, and not any of the second images, to a different computing system for processing, including one or more of recognizing the extracted features, understanding the first set of images, and generating one or more actionable items;
receive, in response to the transmission of the set of first images, data related, in part, to the processed set of first images; and
present, via a user interface, the received data to the user.

7. The mobile device of claim 6, wherein the processor is further configured to execute the computer-executable instructions to detect one or more corners in the plurality of images, wherein the features are extracted from the detected corners.

8. The mobile device of claim 6, wherein the processor is further configured to execute the computer-executable instructions to smooth one or more pixels associated with the plurality of images, wherein the pixels correspond to the extracted features.

9. The mobile device of claim 6, wherein the processor is further configured to execute the computer-executable instructions to:
compute one or more gradients along a first axis and a second axis perpendicular to the first axis; and
based on the computed gradients, generate an output array including one or more feature maps, such that the output array includes a predetermined number of feature maps having a predetermined size.

10. The mobile device of claim 6, wherein the processor is further configured to execute the computer-executable instructions to pool one or more feature maps along a grid, wherein the feature maps correspond to the extracted features.

11. A computing device comprising:
a sensor module configured to capture data corresponding to one or more images observed by a user;
a feature computation module configured to:
identify one or more interest points in the one or more images observed by the user;
extract one or more features from the identified interest points; and
aggregate the extracted features to generate one or more vectors; and
a feature classification module configured to:
based on the generated vectors, determine whether the extracted features satisfy a predetermined threshold;
based on the determination, classify the one or more images observed by the user into a first set of images and a second set of images;
transmit the first set of images to a server, and not the second set of images, the server configured to process the first set of images including one or more of recognizing the extracted features, understanding the first set of images, and generating one or more actionable items;
receive, in response to the transmission of the first set of images, data related, in part, to the processed first set of images; and
present, via a user interface, the received data to the user.

12. The computing device of claim 11, wherein the feature computation module is configured to detect one or more corners in the one or more images, wherein a first corner corresponds to a first interest point.

13. The computing device of claim 11, wherein the feature computation module is configured to:
compute one or more gradients along a first axis and a second axis perpendicular to the first axis; and
based on the computed gradients, generate an output array including a predetermined number of feature maps.

14. The computing device of claim 11, wherein the feature computation module is configured to pool one or more feature maps along a grid, wherein the feature maps correspond to the extracted features.

15. The computing device of claim 11, wherein one or more of the feature computation module and the feature classification module are configured to process one image in parallel with processing another image.

16. The computing device of claim 11, wherein the feature computation module is configured to process an interest point in parallel with processing another interest point.

17. The computing device of claim 11, wherein the feature computation module is configured to process a pixel in parallel with processing another pixel.

18. The computing device of claim 11, wherein one or both of the feature computation module and the feature classification module includes a plurality of submodules, wherein a first submodule of the plurality of submodules is configured to process a first set of data to generate a first output and transmit the first output to a second submodule of the plurality of submodules such that the first submodule is configured to process a second set of data in parallel with the second submodule processing the first output.

19. The computer-implemented method of claim 1, wherein the received data relating to the classified image pertains to one or more of the recognized extracted features, understanding of the image, and the generated one or more actionable items.

20. The computer-implemented method of claim 1, further comprising utilizing the received data in one or more of advertising and a navigation application.

* * * * *